US011461416B2

(12) United States Patent
Arakawa

(10) Patent No.: US 11,461,416 B2
(45) Date of Patent: Oct. 4, 2022

(54) WEB FILTERING SYSTEM

(71) Applicant: NETSTAR INC., Tokyo (JP)

(72) Inventor: Yasuaki Arakawa, Tokyo (JP)

(73) Assignee: NETSTAR INC., Tokyo (JP)

( * ) Notice: Subject to any disclaimer, the term of this patent is extended or adjusted under 35 U.S.C. 154(b) by 544 days.

(21) Appl. No.: 16/051,673

(22) Filed: Aug. 1, 2018

(65) Prior Publication Data

US 2018/0341712 A1 Nov. 29, 2018

Related U.S. Application Data

(63) Continuation of application No. PCT/JP2017/018031, filed on May 12, 2017.

(51) Int. Cl.
*G06F 16/9535* (2019.01)
*H04L 67/02* (2022.01)
(Continued)

(52) U.S. Cl.
CPC ...... *G06F 16/9535* (2019.01); *G06F 16/9574* (2019.01); *G06F 21/44* (2013.01);
(Continued)

(58) Field of Classification Search
CPC .. G06F 16/9535; G06F 16/9574; G06F 21/44; G06F 21/6236; H04L 63/0236; H04L 67/02; H04L 67/2842
See application file for complete search history.

(56) References Cited

U.S. PATENT DOCUMENTS 6,772,214 B1 * 8/2004 McClain ............. G06F 16/9574
709/229
2004/0006621 A1 * 1/2004 Bellinson ............ G06F 16/9535
707/E17.109
(Continued)

FOREIGN PATENT DOCUMENTS

JP H11205380 A 7/1999
JP 2004030678 A 1/2004
(Continued)

OTHER PUBLICATIONS

International Search Report (ISR) dated Aug. 15, 2017 issued in International Application No. PCT/JP2017/018031.
(Continued)

*Primary Examiner* — Kannan Shanmugasundaram
(74) *Attorney, Agent, or Firm* — Holtz, Holtz & Volek PC

(57) ABSTRACT

A web filtering system efficiently controls whether to permit access to a website. The web filtering system includes a first database and a first computer in the server side, and a second database and a second computer in the client side. The first database stores URLs of websites and categories corresponding to the URLs, while the second database stores periodically delivered records constituting part of all records stored in the first database. When an access request to a website occurs, the second computer first tries to determine a category corresponding to a URL of the website by using the second database. Then, when the category is not determined here, the first computer executes determination by using the first database. Thus, the web filtering system minimizes the communication amount between the server side and the client side and shortens the response time required for the control of access requests to websites.

7 Claims, 17 Drawing Sheets

(51) Int. Cl.
*H04L 67/568* (2022.01)
*G06F 16/957* (2019.01)
*G06F 21/44* (2013.01)
*H04L 9/40* (2022.01)
*G06F 21/62* (2013.01)

(52) U.S. Cl.
CPC ...... *G06F 21/6236* (2013.01); *H04L 63/0236* (2013.01); *H04L 67/02* (2013.01); *H04L 67/568* (2022.05)

(56) References Cited

U.S. PATENT DOCUMENTS

| | | | |
|---|---|---|---|
| 2006/0075072 A1* | 4/2006 | Sinclair | H04L 67/02 |
| | | | 709/219 |
| 2008/0163380 A1* | 7/2008 | Liu | G06F 16/9535 |
| | | | 726/28 |
| 2010/0287151 A1 | 11/2010 | Mustonen | |

FOREIGN PATENT DOCUMENTS

| | | | |
|---|---|---|---|
| JP | 2005107831 A | 4/2005 | |
| JP | 2007249723 A | 9/2007 | |
| WO | 2010128082 A1 | 11/2010 | |

OTHER PUBLICATIONS

Extended European Search Report (EESR) dated Aug. 22, 2019 issued in European Application No. 17872886.1.

* cited by examiner

FULL DB

| # | REGISTERED URL | CATEGORY | FLAG |
|---|---|---|---|
| ⋮ | ⋮ | ⋮ | ⋮ |
| 11 | http://www.test.com/ | 100 | HAS_RIGHT |
| 12 | http://www.test.com/admin/ | 101 | |
| 13 | http://www.test.com/adult/ | 118 | |
| ⋮ | ⋮ | ⋮ | ⋮ |
| 14 | http://www.test.com/draft/list.html | 111 | |
| 15 | http://www.test.com/drive/ | 112 | |
| 16 | http://www.test.com/drone/ | 112 | |
| 17 | http://www.test.com/drug/ | 119 | |
| ⋮ | ⋮ | ⋮ | ⋮ |

FIG. 10A

PARTIAL DB

| # | REGISTERED URL | CATEGORY | FLAG |
|---|---|---|---|
| ⋮ | ⋮ | ⋮ | ⋮ |
| 21 | http://www.test.com/ | 100 | HAS_RIGHT |
| 22 | http://www.test.com/admin/ | 101 | |
| 23 | http://www.test.com/adult/ | 118 | |
| ⋮ | ⋮ | ⋮ | ⋮ |
| 24 | http://www.test.com/drug/ | 119 | |
| ⋮ | ⋮ | ⋮ | ⋮ |

FIG. 10B

CACHE DB

| # | REGISTERED URL | CATEGORY | FLAG |
|---|---|---|---|
| ⋮ | ⋮ | ⋮ | ⋮ |
| 31 | http://www.test.com/draft/list.html | 111 | |
| 32 | http://www.test.com/drive/ | 112 | |
| ⋮ | ⋮ | ⋮ | ⋮ |

FIG. 10C

| # | INPUT URL | CATEGORY IDENTIFICATION PLACE | CATEGORY | SERVER DETERMINATION |
|---|---|---|---|---|
| 1 | http://www.test.com/drive/ | CACHE DB | 112 | UNNECESSARY |
| 2 | http://www.test.com/admin/ | PARTIAL DB | 101 | UNNECESSARY |
| 3 | http://www.test.com/drone/ | FULL DB | 112 | NECESSARY |
| 4 | http://www.test.com/drink/ | FULL DB | 100 | NECESSARY |

| # | REGISTERED URL | CATEGORY | FLAG |
|---|---|---|---|
| 41 | http://xyz.com/ | 100 | HAS_LEFT, HAS_LEFT_NOCLEAR |
| 42 | http://aaa.xyz.com/ | 200 | HAS_LEFT |
| 43 | http://a1.aaa.xyz.com/ | 300 | |
| 44 | http://b1.bbb.xyz.com/ | 400 | |
| ... | ... | ... | ... |

FIG. 14B

| # | INPUT URL | RESULT DATA RETURNED FROM LOOKUP SERVER | | |
|---|---|---|---|---|
| | | MATCH URL | CATEGORY | FLAG |
| 1 | http://www.aaa.xyz.com/ | http://www.aaa.xyz.com/ | 200 | |
| 2 | http://a2.aaa.xyz.com/ | http://a2.aaa.xyz.com/ | 200 | |
| 3 | http://bbb.xyz.com/ | http://bbb.xyz.com/ | 100 | HAS_LEFT |

| # | REGISTERED URL | CATEGORY | FLAG |
|---|---|---|---|
| 51 | http://xyz.com/ | 500 | HAS_LEFT, HAS_RIGHT |
| 52 | http://cat.xyz.com/ | 600 | HAS_RIGHT |
| 53 | http://cat.xyz.com/museum/ | 700 | |
| : | : | : | : |
| 61 | http://abc.com/ | 800 | HAS_LEFT, HAS_RIGHT, HAS_RIGHT_NOCLEAR |
| 62 | http://abc.com/drug/ | 900 | |
| : | : | : | : |

FIG. 15A

| # | INPUT URL | RESULT DATA RETURNED FROM LOOKUP SERVER | | |
|---|---|---|---|---|
| | | MATCH URL | CATEGORY | FLAG |
| 1 | http://cat.xyz.com/ | http://cat.xyz.com/ | 600 | HAS_RIGHT |
| 2 | http://cat.xyz.com/music/ | http://cat.xyz.com/musi | 600 | |
| 3 | http://dog.xyz.com/ | http://dog.xyz.com/ | 500 | |
| 4 | http://tokyo.abc.com/ | http://tokyo.abc.com/ | 800 | HAS_RIGHT |
| 5 | http://osaka.abc.com/drug/ | http://osaka.abc.com/drug/ | 900 | |

FIG. 15B

WEB FILTERING SYSTEM

BACKGROUND OF THE INVENTION

Field of the Invention

The present invention relates to a web filtering system for controlling the permission or non-permission of access to websites.

Description of the Related Art

In access to the Internet by user terminals, conventional web filtering technology is used in order to prohibit access to sites whose browsing should be prohibited in some use environments, such as sites presenting gambles, drugs, and adult contents to the public and such as online matching sites and to harmful sites such as phishing sites and sites where malware is set up, thereby restricting the connection to regulation target sites.

SUMMARY OF THE INVENTION

One embodiment of the invention disclosed and claimed herein includes a web filtering system. The web filtering system includes: a first storage configured to store URLs of websites and categories corresponding to the URLs; a lookup server including a first CPU configured to, when accepting a request for determining a category corresponding to a designated URL as a request for server determination, send a result of the determination which is executed using the first storage, as a response to a requester of the server determination; a second storage configured to store periodically delivered records constituting part of all records stored in the first storage; a lookup client which is in communication with the lookup server, the lookup client including a second CPU configured to: (i) when accepting a request for determining a category corresponding to a designated URL as a request for local determination, attempt the determination by using the second storage, and when the category is determined using the second storage, send the determined category as a response to a requester of the local determination, and when the category cannot be determined using the second storage, request the lookup server to execute the server determination while designating the URL, and send the category determined by the lookup server as a response to the requester of the local determination; and (ii) when an access request to a website is made by a user terminal, execute the local determination while designating a URL of the website and control whether to permit the access request or not according to the determined category corresponding to the designated URL.

Further scope of applicability of the present invention will become apparent from the detailed description given hereinafter. However, it should be noted that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

The present invention is described in detail hereinbelow with reference to the accompanying drawing figures, wherein:

FIGS. 10A, 10B, and 10C illustrate tables showing examples of records stored in the respective databases;

FIG. 11 is a table summarizing whether or not the category determination process in the server side is necessary when each input URL is designated;

FIGS. 14A and 14B illustrate explanatory charts of a category determination process using a flag "HAS_LEFT";

FIGS. 15A and 15B illustrate explanatory charts of a category determination process using a flag "HAS_RIGHT";

DETAILED DESCRIPTION

Embodiments of the present invention will be hereinafter described with reference to the drawings. It should be noted that the following embodiments are presented as preferable examples, and the present invention is not limited to these examples.

First Embodiment

Figure 1:
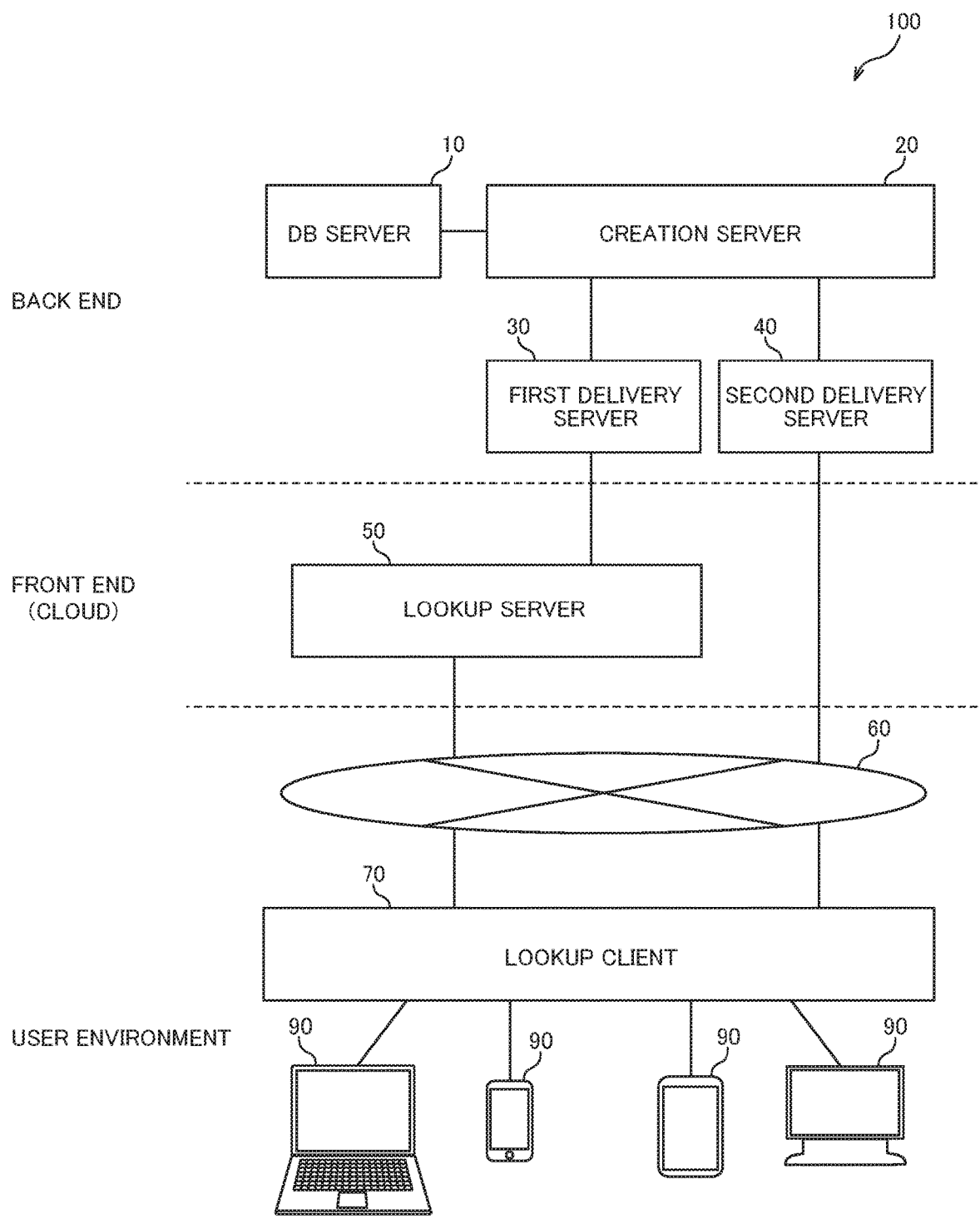
FIG. 1 is a block diagram of an environment where a web filtering system operates.

FIG. 1 is a block diagram of an environment where a web filtering system 100 according to one embodiment operates. The web filtering system 100 is applicable to a computer environment connected to a network such as, for example, the Internet.

As illustrated in this drawing, the web filtering system 100 is constituted by functions disposed in a server side (back end, front end) and a client side (user environment). In the back end, server computers responsible for the creation and delivery of lookup data used in the web filtering system 100, that is, a DB (database) server 10, a creation server 20, a first delivery server 30, and a second delivery server 40 are disposed. The DB server 10 manages/provides a database in which pieces of information regarding websites on the Internet are accumulated. The creation server 20 creates two kinds of databases for delivery based on the information accumulated in the DB server 10. The first delivery server 30 delivers one of the databases created by the creation server 20 to a lookup server 50. The second delivery server 40 delivers the other database to a lookup client 70.

Incidentally, the databases for delivery each include information regarding websites, such as URLs and categories. "Category" means classification assigned to each URL and is assigned according to the contents of each website. In this embodiment, about several hundred categories are defined, which include, for example, categories such as entertainment, sport, adult, and malware.

In the front end (cloud), the lookup server 50 is disposed. The lookup server 50 is a server computer having a function of lookup that operates in the server side (hereinafter, referred to as "server lookup"). Here, "lookup" refers to processing to obtain information regarding a specific URL from the database by matching processing. The lookup server 50 corresponds to, for example, a cloud server used by business organizations, schools, and so on being users of the web filtering system 100, and a cloud server that a provider of the web filtering system 100 provides to business organizations, schools, and so on being users. The lookup server 50 executes the server lookup based on a request from the lookup client 70 and sends the result to the lookup client 70 as a response.

In the user environment, the lookup client 70 is disposed. User terminals 90 are connected to the lookup client 70 through a network. The lookup client 70 is a server computer having a function of lookup that operates in the client side (hereinafter, referred to as "local lookup") and controls whether to permit access to websites by the user terminals 90 or not. The lookup client 70 corresponds to, for example, a router, a proxy server, or the like disposed in a firewall in a business organization, a school, or the like being a user of the web filtering system 100 to relay the communication between the user terminals 90 and websites on the Internet.

The user terminals 90 are computers that the users use when accessing websites, and have an ordinary browsing function. The user terminals 90 correspond to, for example, mobile devices such as computers, smartphones, or tablet PCs.

When the user terminal 90 tries to access a website through a web browser or the like, the lookup client 70 detects this access request, executes the local lookup first, and requests the lookup server 50 to execute the server lookup when necessary. The lookup client 70 controls whether to permit access to the website by the user terminal 90, based on the execution result of the lookup. In the following description, URL of a website an access request to which is made will be referred to as "input URL".

Incidentally, functions that the server computers 10, 20, 30, 40, 50, 70 have and specific flows of processes involved in the determination of categories corresponding to input URLs will be described in detail later with reference to other drawings.

Figure 2:
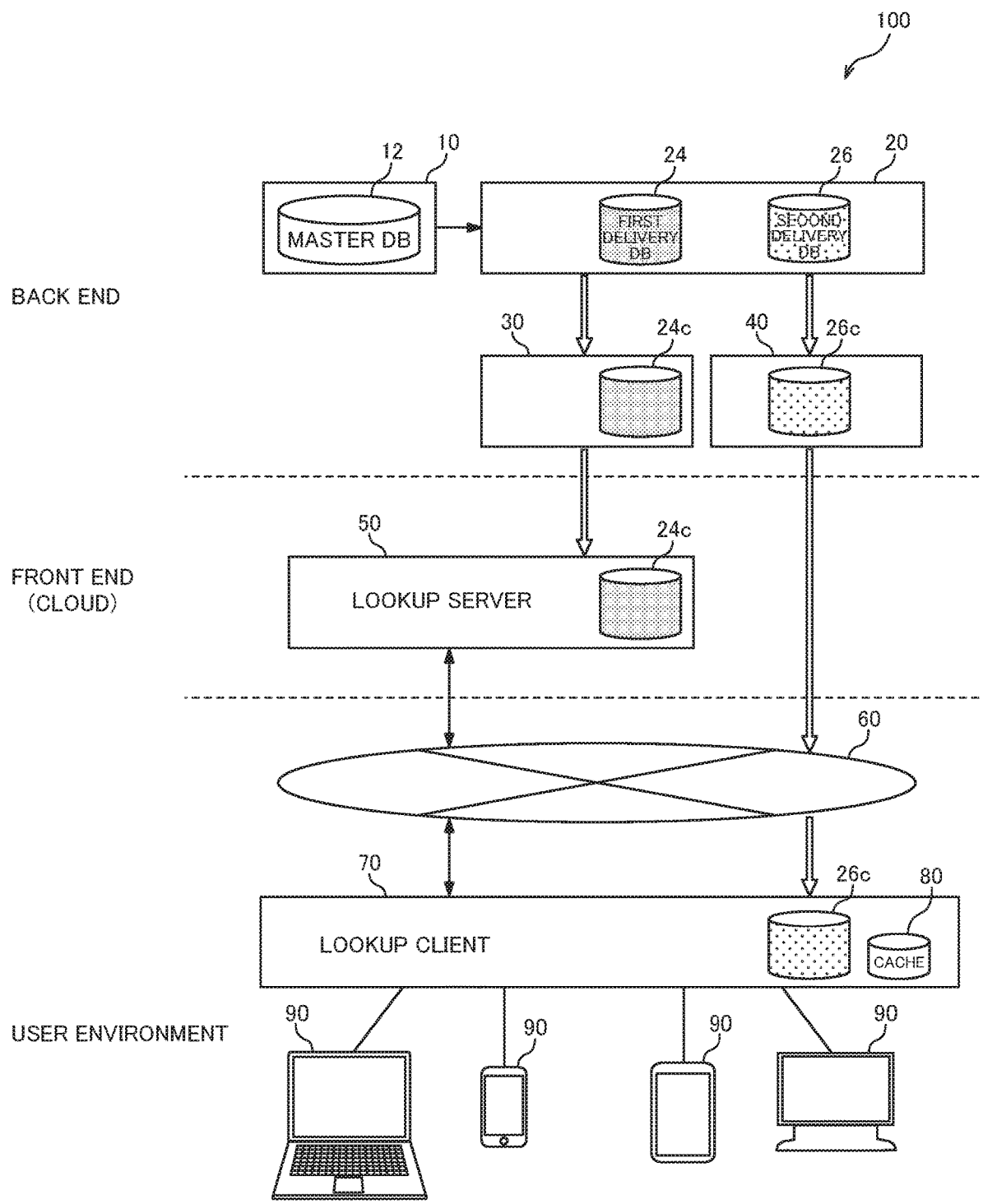
FIG. 2 is a schematic diagram illustrating the flows of data in the web filtering system.

FIG. 2 is a schematic diagram illustrating the flows of data in the web filtering system 100 according to the embodiment. Note that the outline arrows in the drawing indicate the flows of the databases, and the black arrows indicate the flows of data other than the databases.

The DB server 10 manages/provides a master DB 12 in which pieces of the information regarding the websites on the Internet are accumulated. The creation server 20, which is mutually connectable to the DB server 10 through a network or the like, reads the data stored in the master DB 12 and creates the two kinds of databases, that is, a first delivery DB 24 and a second delivery DB 26 based on the read data. The first delivery DB 24 is used in the server lookup executed in the lookup server 50, and the second delivery DB 26 is used in the local lookup executed in the lookup client 70.

The creation server 20 is also mutually connectable to the first delivery server 30 and the second delivery server 40 through a network or the like. The creation server 20 transfers a first delivery DB 24c which is a duplicate of the first delivery DB 24 to the first delivery server 30, and transfers a second delivery DB 26c which is a duplicate of the second delivery DB 26 to the second delivery server 40.

The first delivery server 30 is mutually connectable to the lookup server 50 through a network or the like, and delivers the first delivery DB 24c to the lookup server 50 based on a request from the lookup server 50.

The second delivery server 40 is mutually connectable to the lookup client 70 through the Internet 60, and delivers the second delivery DB 26c to the lookup client 70 based on a request from the lookup client 70.

The lookup server 50 is mutually connectable to the lookup client 70 through the Internet 60. When accepting a request from the lookup client 70, the lookup server 50 executes the server lookup by using the first delivery DB 24c based on an input URL transmitted with this request, and transmits, to the lookup client 70, a category and other incidental information which are obtained as a result of the execution.

The lookup client 70 is connectable to the Internet 60. When an access request to a website by the user terminal 90 occurs, the lookup client 70 first executes the local lookup by using the second delivery DB 26c and a cache DB 80 to try to identify a category corresponding to an input URL. The cache DB 80 is a database temporarily storing result data transmitted from the lookup server 50. When the category is identified by the local lookup, the lookup client 70 controls whether to permit the access to the website based on the identified category. On the other hand, when the category is not identified by the local lookup, the lookup client 70 requests the lookup server 50 to execute the server lookup, and based on a response result from the lookup server 50 to this request, controls whether to permit the access to the website.

Figure 3:
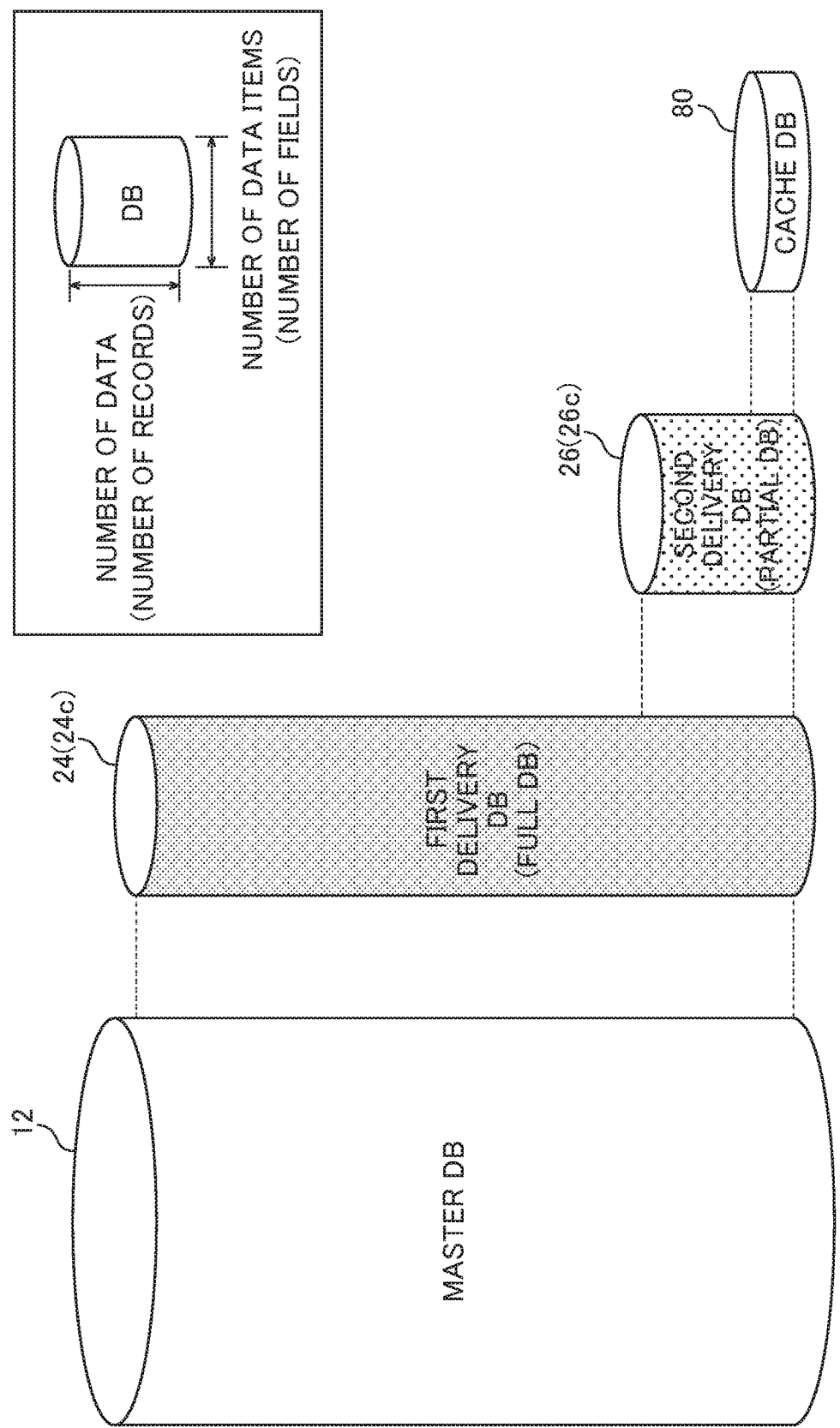
FIG. 3 is a schematic diagram illustrating relative scales of respective databases involved in the web filtering system.

FIG. 3 is a schematic diagram illustrating relative scales of the respective databases involved in the web filtering system 100. In FIG. 3, the four databases involved in the web filtering system 100 are depicted as the columns different in size. The size differences among them visually express differences in scale among the databases. The diameter of each of the columns corresponds to the number of data items associated with URLs registered in each of the databases (hereinafter, referred to as "registered URLs"), that is, corresponds to the number of fields in the database. Further, the height of the column corresponds to the number of data corresponding to the registered URLs being their keys, that is, the number of records in the database.

In FIG. 3, the master DB 12 is a database in which pieces of detailed information regarding the websites on the Internet are accumulated. In the master DB 12, many data items including, for example, registered URL, protocol, port, domain hierarchy, path hierarchy, keyword hit in site, category, date of data registration, date of data update, and access log are stored.

In FIG. 3, the first delivery DB 24, 24c is created by extracting only data items necessary for the server lookup from the data items stored in the master DB 12 and appending various kinds of flags which are used in a process of identifying categories corresponding to input URLs. Further, in creating the first delivery DB 24, 24c, part of the records stored in the master DB 12 (for example, records falling under categories that are not delivery targets and noise records) are excluded. That is, in the first delivery DB 24, 24c, the number of the stored data of the registered URLs is slightly smaller than the number of the data in the master DB 12, and the number of the stored data items is smaller than the number of the data items in the master DB 12. In the first delivery DB 24, 24c, the data items such as registered URL, category, and flag are stored, for instance. The data size of the first delivery DB 24, 24c reaches, for example, over 4 to 5 GB.

In FIG. 3, the second delivery DB 26, 26c is constituted by data items necessary for the local lookup, and has the same structure as that of the first delivery DB 24, 24c. The second delivery DB 26, 26c is used in the lookup executed in the lookup client 70, and accordingly the number of its data is reduced to a necessary and sufficient amount. That is, in the second delivery DB 26, 26c, the number of the stored data items is the same as the number of the data items in the first delivery DB 24, 24c, but the number of the data stored therein is smaller than the number of the data in the first delivery DB 24, 24c. In the second delivery DB 26, 26c, partial data (for example, about 10 percent of the entire data) extracted from the entire data stored in the first delivery DB 24, 24c according to a predetermined criterion is stored.

As described above, the data stored in the second delivery DB 26, 26c is partial data constituting part of the entire data (full data) stored in the first delivery DB 24, 24c. Therefore, in the following description, the first delivery DB 24, 24c will be referred to as full DB 24, 24c, and the second delivery DB 26, 26c will be referred to as partial DB 26, 26c.

In FIG. 3, the cache DB 80 is a database temporarily storing the result data of the server lookup transmitted from the lookup server 50 and is stored in, for example, an internal storage area of the lookup client 70. The result data transmitted from the lookup server 50 is constituted by three data items, that is, match URL, category, and flag. When a category corresponding to an input URL is not identified by the local lookup, the lookup client 70 requests the lookup server 50 to execute the server lookup, and based on the result data transmitted as a response to this request, updates the cache DB 80. Data items stored in the cache DB 80 include items used for update control of the cache DB 80 besides the three items, match URL, category, and flag. Accordingly, the number of the data items stored in the cache DB 80 is slightly larger than the number of the data items in the full DB 24, 24c and the partial DB 26, 26c.

Note that "match URL" is a URL corresponding to a matching part found as a result of the comparison between a registered URL and an input URL. For example, when an input URL is "http://www.test.com/a/" and a registered URL "http://www.test.com/a/bcd" is stored in the full DB 24c referred to in the server lookup, "http://www.test.com/a/" is returned as the match URL. The lookup client 70 stores, in the cache DB 80, the match URL as the registered URL together with the category and various kinds of the flags which are returned with the match URL. When an access request to the same website occurs again while these pieces of data are stored in the cache DB 80, the lookup client 70 is capable of identifying a category corresponding to the input URL only by the local lookup by using the cache DB 80, and does not need to request the lookup server 50 to execute the server lookup. Accordingly, the communication amount of the lookup client 70 with the lookup server 50 required for the lookup can be minimized, and the lookup client 70 is capable of performing the access control efficiently.

At the time of the activation of the lookup client 70, the cache DB 80 is in an empty state with the entire data stored therein being cleared, but its data amount increases as the result data of the server lookup is accumulated. Further, for the data size of the cache DB 80, an upper limit (for example, 100 MB) is set according to a requirement in each user environment (business organization, school, or the like). When the data size of the cache DB 80 exceeds the upper limit, the data stored in the cache DB 80 is cleared based on a predetermined rule, so that a vacant area is reserved.

It should be noted that the sizes of the four databases illustrated in FIG. 3 are expressed only for the purpose of enabling the intuitive understanding of the differences in scale, and these sizes do not represent an accurate relative ratio among the actual scales of the databases. For example, the partial DB 26, 26c in FIG. 3 is depicted with an about 30% height of that of the full DB 24, 24c in FIG. 3, but the number of the data stored in the partial DB 26, 26c is, for example, about 10% of the number of the data stored in the full DB 24, 2c.

Figure 4:
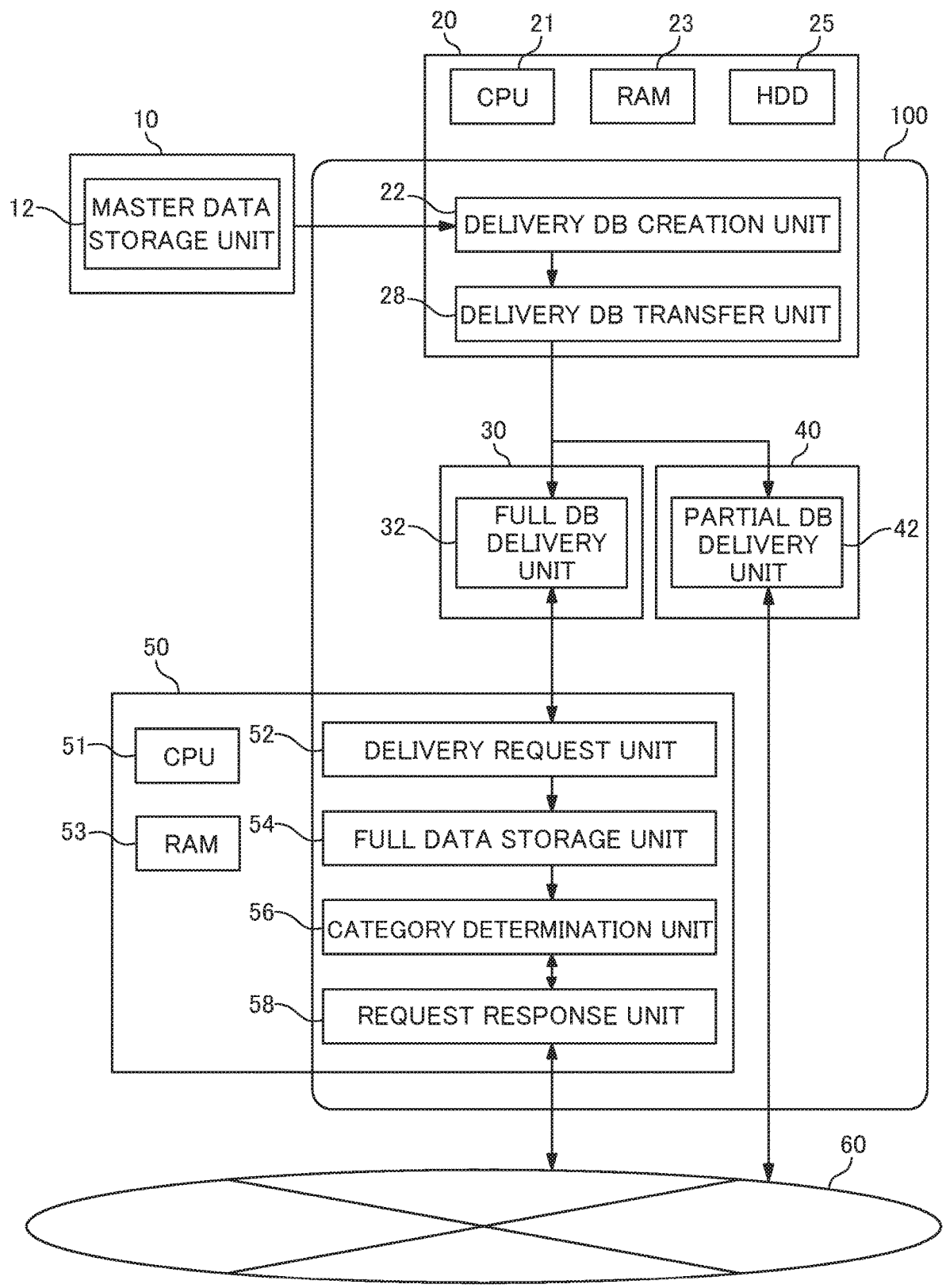
FIG. 4 is a functional block diagram (1/2) of the web filtering system.
Figure 5:
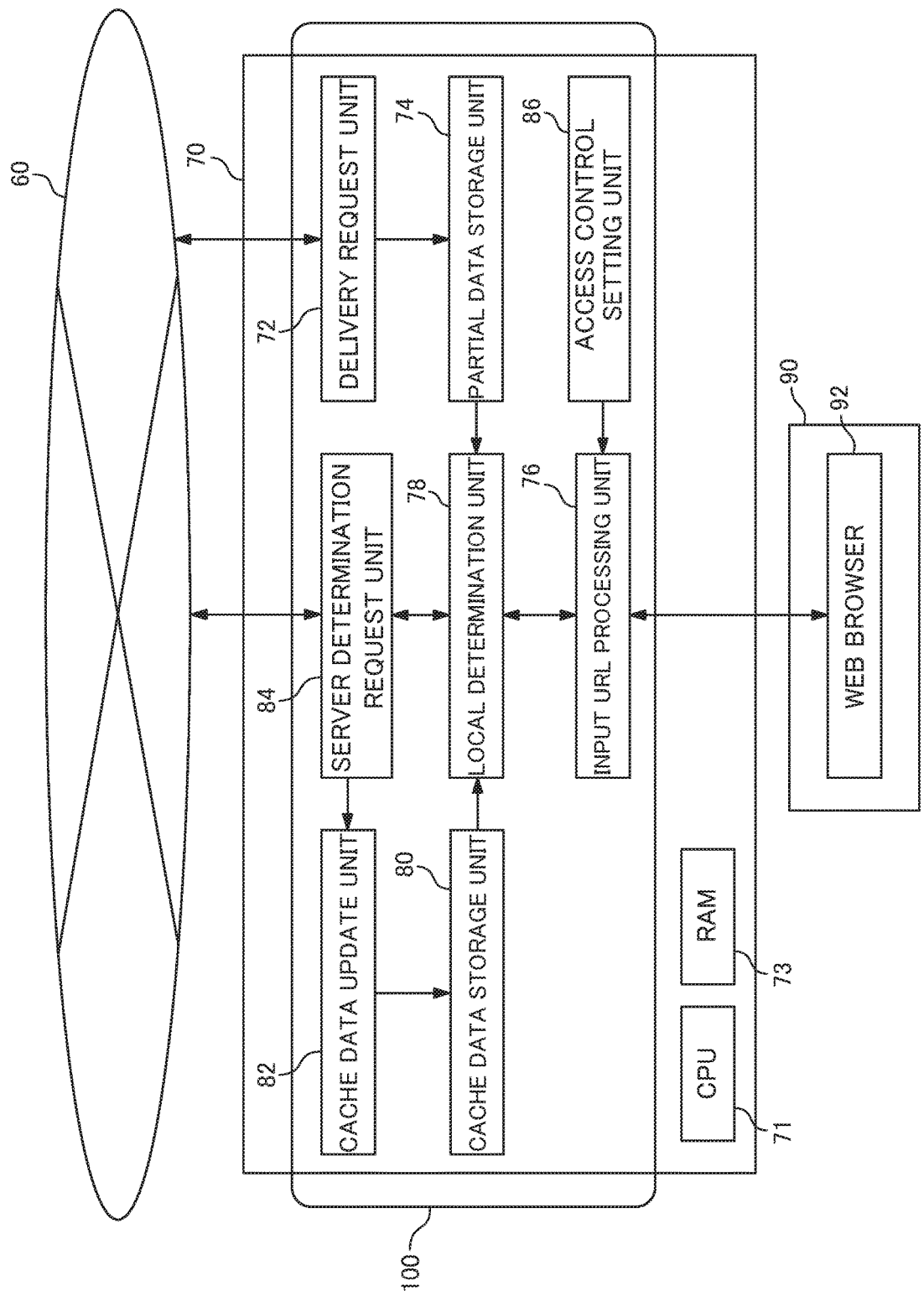
FIG. 5 is a functional block diagram (2/2) of the web filtering system.

FIG. 4 and FIG. 5 are functional block diagrams of the web filtering system 100. The web filtering system 100 is configured to cover the server side (the server computers 20, 30, 40, 50) and the client side (server computer 70).

FIG. 4 is a block diagram illustrating functions that the web filtering system 100 has in the server side. As illustrated in this drawing, the web filtering system 100 has, in the server side, a delivery DB creation unit 22, a delivery DB transfer unit 28, a full DB delivery unit 32, a partial DB delivery unit 42, a delivery request unit 52, a full data storage unit 54, a category determination unit 56, and a request response unit 58.

The functional units 22, 28, 32, 42 involved in the creation and the delivery of the databases used in the server lookup and the local lookup are implemented in the creation server 20, the first delivery server 30, and the second delivery server 40.

The delivery DB creation unit 22 creates the two databases for delivery (the full DB 24, the partial DB 26) based on the data stored in the master data storage unit 12 (master DB 12) implemented in the DB server 10.

The delivery DB transfer unit 28 transfers the duplicates of the databases created by the delivery DB creation unit 22 to the delivery servers. Specifically, the delivery DB transfer unit 28 transfers the full DB 24c to the first delivery server 30 and transfers the partial DB 26c to the second delivery server 40.

The full DB delivery unit 32 delivers the full DB 24c according to a request from the lookup server 50.

The partial DB delivery unit 42 delivers the partial DB 26c according to a request from the lookup client 70.

In the lookup server 50, the functional units 52, 54, 56, 58 necessary for executing the server lookup are implemented.

The delivery request unit 52 requests the first delivery server 30 to deliver the full DB 24c.

The full data storage unit 54 is a storage area corresponding to the full DB 24c delivered from the first delivery server 30 and stores all the records of the full DB 24c.

The category determination unit 56 executes the server lookup by using the data stored in the full data storage unit 54 to thereby determine a category corresponding to an input URL.

The request response unit 58 accepts a request from the lookup client 70 and sends the result of the category determination that the category determination unit 56 performs for the input URL, to the lookup client 70 as a response.

FIG. 5 is a block diagram illustrating functions that the web filtering system 100 has in the client side. As illustrated in this drawing, the web filtering system 100 has, in the client side (the lookup client 70), a delivery request unit 72, a partial data storage unit 74, an input URL processing unit 76, a local determination unit 78, a cache data storage unit 80, a cache data update unit 82, a server determination request unit 84, and an access control setting unit 86.

In the lookup client 70, the functional units 72, 74, 76, 78, 80, 82, 84, 86 necessary for controlling whether to permit access to websites by the user terminals 90 are implemented.

The delivery request unit 72 requests the second delivery server 40 to deliver the partial DB 26c.

The partial data storage unit 74 is a storage area corresponding to the partial DB 26c delivered from the second delivery server 40 and stores all the records of the partial DB 26c.

When an access request to a website is made through a web browser 92 of the user terminal 90, the input URL processing unit 76 gives a URL (input URL) of the website to the local determination unit 78 to obtain a category corresponding to the input URL, and further obtains the setting of the permission/non-permission of access to websites falling under this category from the access control setting unit 86 to control the access to the website according to the obtained setting.

The local determination unit 78 executes the local lookup by using the data stored in the partial data storage unit 74 and the cache data storage unit 80 to try to identify the category corresponding to the input URL. When the category is not identified by the local lookup, the local determination unit 78 requests the lookup server 50 through the server determination request unit 84 to execute the category determination by the server lookup. The local determination unit 78 returns the finally identified category corresponding to the input URL to the input URL processing unit 76.

The server determination request unit 84 gives the input URL to the lookup server 50 and requests the lookup server 50 to execute the category determination for the input URL. Further, the server determination request unit 84 receives result data of the category determination from the lookup server 50 to give the result data to the cache data update unit 82 and to return the category identified by the category determination in the lookup server 50 to the local determination unit 78.

The cache data storage unit 80 is a storage area corresponding to the cache DB 80 and stores the result data of the category determination by the server lookup.

The cache data update unit 82 updates the data stored in the cache data storage unit 80 based on the result data given from the server determination request unit 84.

The access control setting unit 86 provides a screen used for the user setting regarding the categories defined in the web filtering system 100, that is, for the setting on whether to permit access to websites corresponding to the respective categories in a user environment, and stores the access control setting which is made by a manager in the user environment through this setting screen.

When the user terminal 90 makes an access request to a website through the web browser 92, the functional units 72, 74, 76, 78, 80, 82, 84, 86 implemented in the lookup client 70 operate in association to identify the category corresponding to the input URL and control the access according to the category. When the requested website falls under an access-permitted category, the user terminal 90 is permitted to access the website. On the other hand, when the requested website falls under an access-non-permitted category, the user terminal 90 is not permitted to access the website. At this time, the user terminal 90 receives a message indicating that the access is not permitted, from the input URL processing unit 76, and displays the message on a browsing area of the web browser 92. This display enables the user to recognize that the access to the website is not permitted (blocked).

Figure 6:
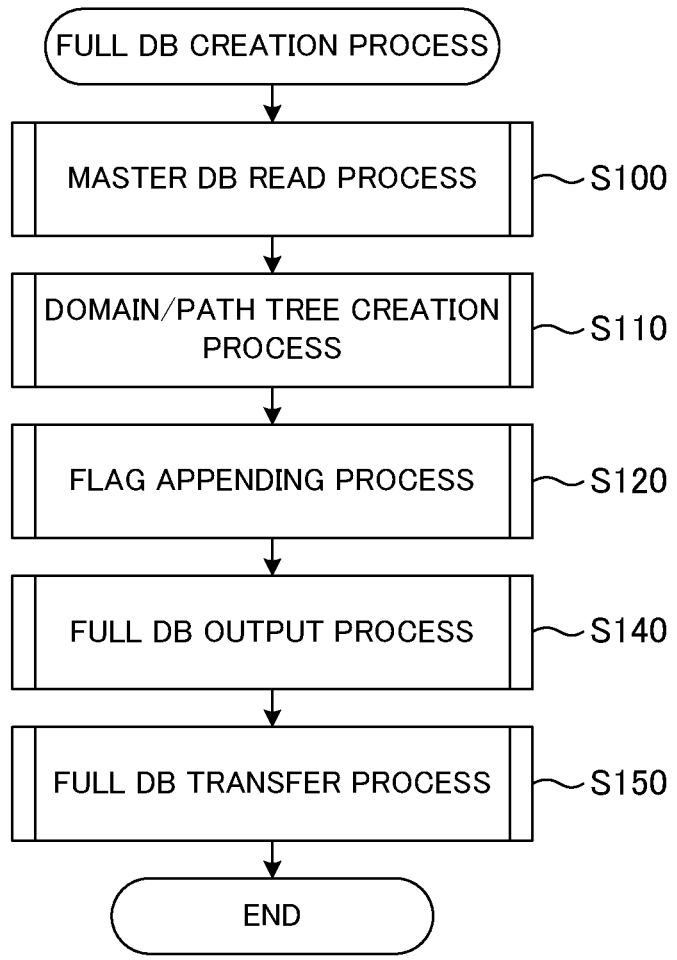
FIG. 6 is a flowchart illustrating a procedure example of a full DB creation process.

FIG. 6 is a flowchart illustrating a procedure example of a full DB creation process executed in the creation server 20. Steps shown in the flowchart are executed by the functional units that the web filtering system 100 has in the creation server 20, but a main body that causes the functional units to operate is a CPU 21 of the creation server 20. This process will be described below according to the procedure example.

Step S100: The CPU 21 causes the delivery DB creation unit 22 to execute a master DB read process. In this process, the delivery DB creation unit 22 reads predetermined data fields of all the records stored in the master DB 12 except some records (for example, records falling under categories that are not delivery targets and noise records) to load them onto a RAM 23.

Step S110: The CPU 21 causes the delivery DB creation unit 22 to execute a domain/path tree creation process. In this process, the delivery DB creation unit 22 constructs data that is a tree structure of hierarchies of domain parts and path parts constituting the registered URLs, by using the data loaded onto the RAM 23 in the previous Step S100.

Step S120: The CPU 21 causes the delivery DB creation unit 22 to execute a flag appending process. In this process, regarding each domain, the delivery DB creation unit 22 performs various kinds of determinations (for example, the determination on the presence/absence of any other registered URL having a subdomain and on the presence/absence of any other registered URL in a subordinate path), by using the data of the tree structure constructed in the previous Step S110 and appends various kinds of flags to the registered URLs based on the results of these determinations.

Step S140: The CPU 21 causes the delivery DB creation unit 22 to execute a full DB output process. In this process, the delivery DB creation unit 22 converts the data of the tree structure to which the flags are appended in the previous Step S120 into data having a data format for delivery, and outputs the resultant data as the full DB 24. The full DB 24 is output onto a HDD 25, for instance.

Step 150: The CPU 21 causes the delivery DB transfer unit 28 to execute a full DB transfer process. In this process, the delivery DB transfer unit 28 transfers, to the first delivery server 30, the duplicate 24c of the full DB 24 output in the previous Step S140.

When the above procedure is finished, the full DB creation process is finished.

Figure 7:
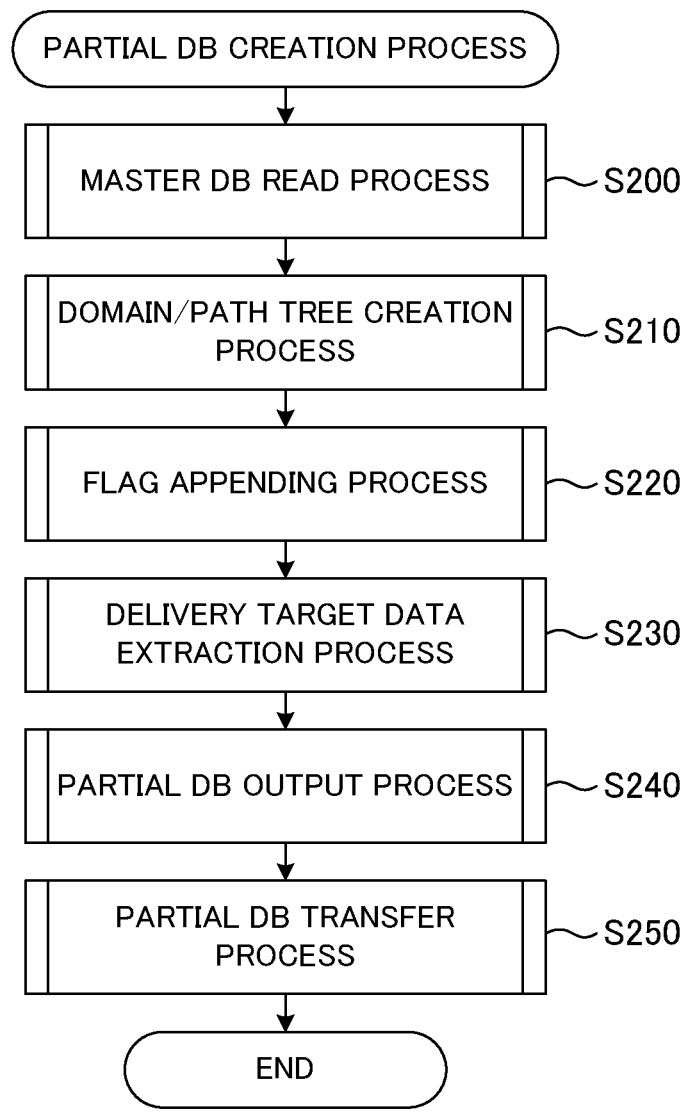
FIG. 7 is a flowchart illustrating a procedure example of a partial DB creation process.

FIG. 7 is a flowchart illustrating a procedure example of a partial DB creation process executed in the creation server 20. A main body of the operations in steps shown in the flowchart is the same as that in the full DB creation process in FIG. 6. Hereinafter, this process will be described according to the procedure example.

Step S200: The CPU 21 causes the delivery DB creation unit 22 to execute a master DB read process. In this process, the delivery DB creation unit 22 reads predetermined data fields of all the records stored in the master DB 12 except some records (for example, records falling under categories that are not delivery targets and noise records) to load them onto the RAM 23.

Step S210: The CPU 21 causes the delivery DB creation unit 22 to execute a domain/path tree creation process. In this process, the delivery DB creation unit 22 constructs data that is a tree structure of hierarchies of domain parts and path parts constituting the registered URLs, by using the data loaded onto the RAM 23 in the previous Step S200.

Step S220: The CPU 21 causes the delivery DB creation unit 22 to execute a flag appending process. In this process, regarding each domain, the delivery DB creation unit 22 performs various kinds of determinations (for example, the determination on the presence/absence of any other registered URL having a subdomain and on the presence/absence of any other registered URL in a subordinate path), by using the data of the tree structure constructed in the previous Step S210 and appends various kinds of flags to the registered URLs based on the results of these determinations.

Step S230: The CPU 21 causes the delivery DB creation unit 22 to execute a delivery target data extraction process. In this process, according to a predetermined criterion, the delivery DB creation unit 22 extracts partial data that is a delivery target from the data of the tree structure to which the flags are appended in the previous Step S220. For example, data of registered URLs that have a larger access number and do not have a flag appended thereto is given a higher priority, and partial data constituting part of the entire data is extracted.

Step S240: The CPU 21 causes the delivery DB creation unit 22 to execute a partial DB output process. In this process, the delivery DB creation unit 22 converts the partial data extracted in the previous Step S230 into data having a data format for delivery, and outputs the resultant data as the partial DB 26. The partial DB 26 is output onto the HDD 25, for instance.

Step 250: The CPU 21 causes the delivery DB transfer unit 28 to execute a partial DB transfer process. In this process, the delivery DB transfer unit 28 transfers, to the second delivery server 40, the duplicate 26c of the partial DB 26 output in the previous Step S240.

When the above procedure is finished, the partial DB creation process is finished.

Figure 8:
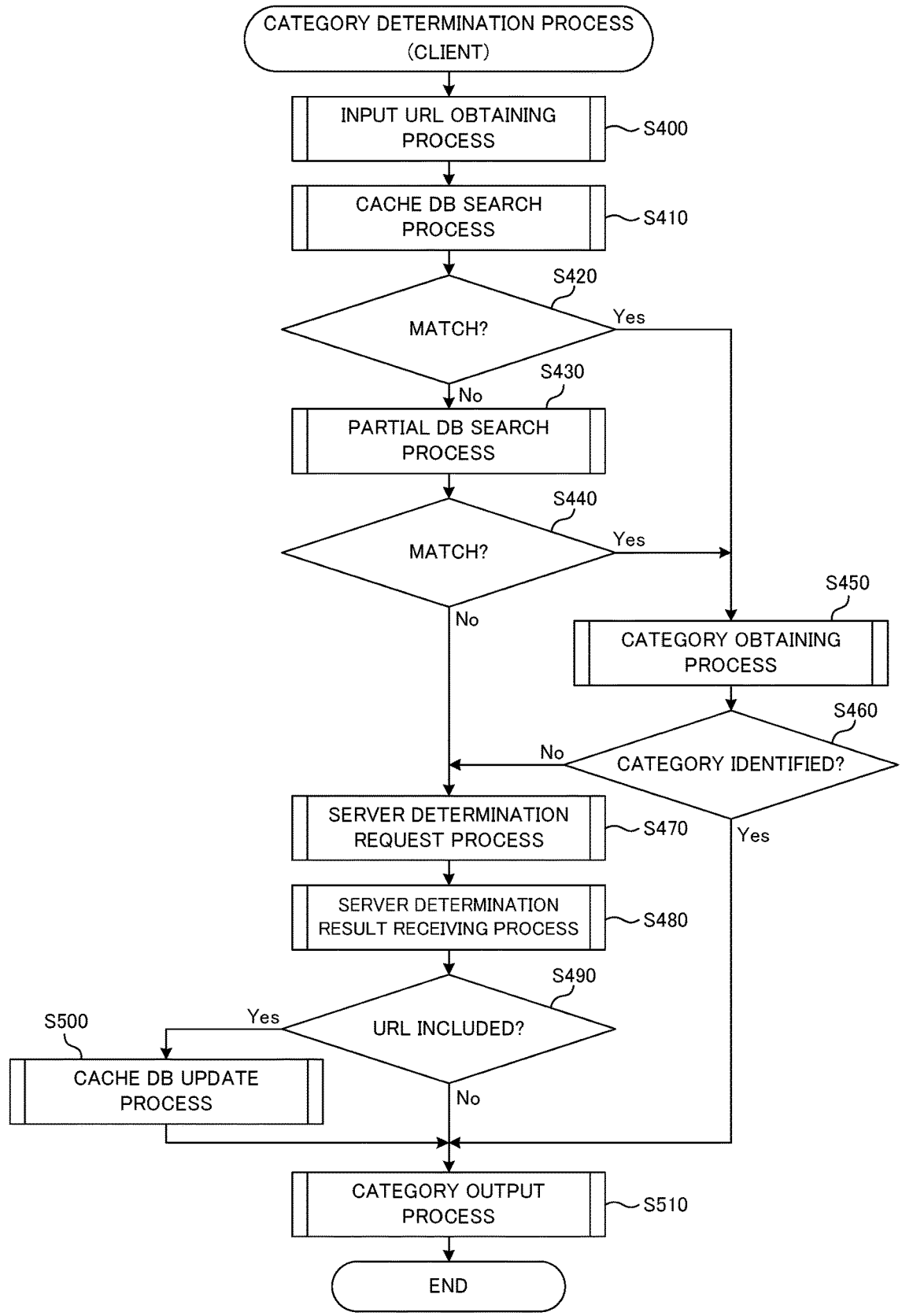
FIG. 8 is a flowchart illustrating a procedure example of a category determination process executed in a client side.

FIG. 8 is a flowchart illustrating a procedure example of a category determination process executed in the lookup client 70. Steps shown in the flowchart are executed by the functional units that the web filtering system 100 has in the lookup client 70, but a main body that causes the functional units to operate is a CPU 71 of the lookup client 70. Hereinafter, this process will be described according to the procedure example.

Step S400: The CPU 71 causes the input URL processing unit 76 to execute an input URL obtaining process. In this process, the input URL processing unit 76 obtains an input URL accompanied by an access request to a website made by the user terminal 90 through the web browser 92.

Step S410: The CPU 71 causes the local determination unit 78 to execute a cache DB search process. In this process, the local determination unit 78 searches the cache DB 80 by using the input URL obtained in the previous Step S400 as a search key (local lookup).

Step S420: The CPU 71 causes the local determination unit 78 to confirm whether a record having a registered URL matching the input URL is hit in the search executed in the previous Step S410. When there is a hit record (Step S420: Yes), the CPU 71 next executes Step S450. On the other hand, when there is no hit record (Step S420: No), the CPU 71 next executes Step S430.

Step S430: The CPU 71 causes the local determination unit 78 to execute a partial DB search process. In this process, the local determination unit 78 searches the partial DB 26c by using the input URL obtained in Step S400 as a search key (local lookup).

Step S440: The CPU 71 causes the local determination unit 78 to confirm whether a record having a registered URL matching the input URL is hit in the search executed in the previous Step S430. When there is a hit record (Step S440: Yes), the CPU 71 next executes Step S450. On the other hand, when there is no hit record (Step S440: No), the CPU 71 next executes Step S470.

Step S450: The CPU 71 causes the local determination unit 78 to execute a category obtaining process. In this process, the local determination unit 78 tries to identify a category corresponding to the input URL based on data such as the registered URL, a flag, and a category corresponding to the record hit in the search executed in Step S410 or S430.

Step S460: The CPU 71 causes the local determination unit 78 to confirm whether the category corresponding to the input URL is identified by the execution of the previous Step S450. When the category is identified (Step S460: Yes), the CPU 71 next executes Step S510. On the other hand, when the category is not identified (Step S460: No), the CPU 71 next executes Step S470.

Step S470: The CPU 71 causes the server determination request unit 84 to execute a server determination request process. In this process, the server determination request unit 84 transmits, to the lookup server 50, a request for determining the category corresponding to the input URL.

Step S480: The CPU 71 causes the server determination request unit 84 to execute a server determination result receiving process. In this process, the server determination request unit 84 receives result data of the category determination which is transmitted from the lookup server 50 as a response to the request transmitted in the previous Step S470.

Step S490: The CPU 71 causes the local determination unit 78 to confirm whether the result data received in the previous Step S480 includes a URL. When the result data includes a URL (Step S490: Yes), the CPU 71 next executes Step S500. On the other hand, when the result data does not include a URL (Step S490: No), the CPU 71 next executes Step S510.

Step S500: The CPU 71 causes the cache data update unit 82 to execute a cache DB update process. In this process, the cache data update unit 82 updates the data of the cache DB 80 based on the result data received by the server determination request unit 84 in Step S480.

Step S510: The CPU 71 causes the local determination unit 78 to execute a category output process. In this process, the local determination unit 78 outputs the identified category corresponding to the input URL.

When the above procedure is finished, the category determination process executed in the client side is finished.

Figure 9:
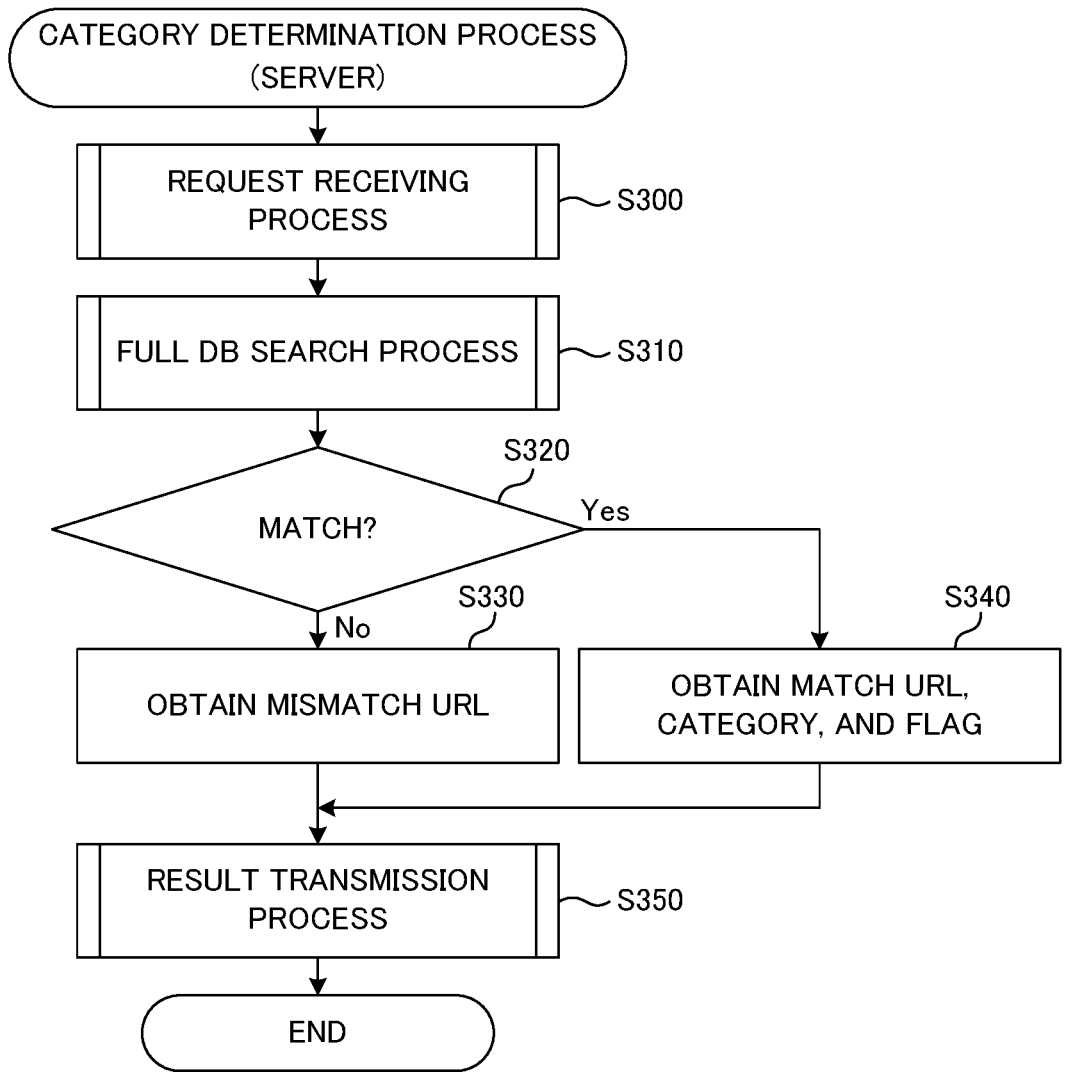
FIG. 9 is a flowchart illustrating a procedure example of a category determination process executed in a server side.

FIG. 9 is a flowchart illustrating a procedure example of a category determination process executed in the lookup server 50. Steps shown in the flowchart are executed by the functional units that the web filtering system 100 has in the lookup server 50, but a main body that causes the functional units to operate is a CPU 51 of the lookup server 50. Hereinafter, this process will be described according to the procedure example.

Step S300: The CPU 51 causes the request response unit 58 to execute a request receiving process. In this process, the request response unit 58 receives a request for the category determination transmitted from the lookup client 70 and obtains an input URL transmitted with this request.

Step S310: The CPU 51 causes the category determination unit 56 to execute a full DB search process. In this process, the category determination unit 56 searches the full DB 24*c* by using the input URL obtained in the previous Step S300 as a search key (server lookup).

Step S320: The CPU 51 causes the category determination unit 56 to confirm whether a record having a registered URL matching the input URL is hit in the search executed in the previous Step S310. When there is a hit record (Step S320: Yes), the CPU 51 next executes Step S340. On the other hand, when there is no hit record (Step S320: No), the CPU 51 next executes Step S330.

Step S330: The CPU 51 causes the category determination unit 56 to obtain a mismatch URL. Here, "mismatch URL" refers to a match URL when the category corresponding to the input URL is not identified based on the category and various kinds of the flags appended to the match URL obtained as a result of the comparison between the registered URLs and the input URL. In other words, the mismatch URL refers to a match URL when the input URL is determined as falling under an unclassified category. However, the category determination unit 56 excludes a match URL when a domain part of the input URL is unregistered, from the mismatch URL.

Step S340: The CPU 51 causes the category determination unit 56 to obtain a match URL, a category, and a flag. In this process, the category determination unit 56 obtains, in addition to the match URL when the input URL is determined as falling under any category, the category and various kinds of the flags appended to this match URL.

Step S350: The CPU 51 causes the request response unit 58 to execute a result transmission process. In this process, the request response unit 58 transmits, to the lookup client 70, the result data of the category determination obtained in Step S330 or Step S340.

When the above procedure is finished, the category determination process executed in the server side is finished.

FIGS. 10A, 10B, and 10C illustrate tables showing examples of the records stored in the databases (the full DB 24*c*, the partial DB 26*c*, the cache DB 80) used in the web filtering system 100. In each of the tables, the left column indicates the number assigned for convenience of the description, the second column from the left indicates registered URL, the second column from the right indicates category ID, and the right column indicates flag.

Here, out of the records stored in the databases, records each having a registered URL of a website belonging to a domain "www.test.com" are shown as examples. More specifically, the tables each include records having a registered URL "http://www.test.com", a registered URL beginning with "http://www.test.com/ad", and a registered URL beginning with "http://www.test.com/dr".

In FIG. 10A, the examples of the records stored in the full DB 24*c* used in the server lookup, seven records No. 11 to 17 are shown. No. 11 is a record in which the path part of the registered URL is the root "/", No. 12, 13 are records in which path parts of the registered URLs begin with "/ad", and No. 14 to 17 are records in which path parts of the registered URLs begin with "/dr". Further, a flag "HAS_RIGHT" is appended to the record No. 11.

The flag "HAS_RIGHT" indicates that there is stored another record whose registered URL has a path part that forwardly matches and is longer than a path part of a registered URL of a record to which this flag is appended. Specific examples will be further described later. Further, a flag "HAS_LEFT" indicates that there is stored another record having a registered URL whose parent domain is a domain part of a registered URL of a record to which this flag is appended. For example, if a record having a registered URL "http://test.com/" is stored in the full DB 26*c*, the flag "HAS_LEFT" is appended to this record because the domain part "test.com" of this registered URL is the parent domain of the domain part "www.test.com" of the registered URL of No. 11. In the web filtering system 100, various kinds of flags are prepared in addition to these, but a description thereof will be omitted here. Incidentally, specific examples of the category determination process using the flags will be described in detail with reference to other drawings.

As described above, the full DB 24*c* and the partial DB 26*c* are created with the data structure enabling the category determination using various kinds of the flags. This frees the lookup server 50 and the lookup client 70 from the need to perform the thorough matching of all the records whose registered URLs partially match the input URL in the course of the lookup to enable the efficient matching.

In FIG. 10B, the examples of the records stored in the partial DB 26*c* used in the local lookup, four records No. 21 to 24 are shown. The records No. 21, 22, 23, 24 match the records No. 11, 12, 13, 17 included in the full DB 24*c* respectively, and the full DB 24*c* includes all the registered records of the partial DB 26*c*. This indicates that the partial DB 26*c* is a subset of the full DB 24*c*.

In FIG. 10C, the examples of the records stored in the cache DB 80 used in the local lookup, two records are shown. The records No. 31, 32 match the records No. 14, 15 included in the full DB 24*c* respectively. None of the records stored in the cache DB 80 is included in the partial DB 26*c*. This indicates that the server lookup was performed because it was not possible to identify a category corresponding to an input URL by using the partial DB 26*c*, and data returned as the result of the server lookup, that is, data not included in the partial DB 26*c* is stored in the cache DB 80.

FIG. 11 is a table summarizing whether the category determination process in the server side is necessary or not when each input URL is designated. In the table, the left column indicates the number assigned for convenience of the description, and the second column from the left indicates input URL. The third column from the left indicates an identification place of the category corresponding to the input URL, that is, a database whose record serves as the basis for identifying the category. Further, the second column from the right indicates category ID output in Step S510 in FIG. 8 as the result of the category determination process. The right column indicates whether the category determination process in the server side is necessary or not.

Hereinafter, how the categories corresponding to the input URLs are identified using the databases illustrated in FIGS. 10A, 10B, and 10C will be described in the order of the number.

The input URL of No. 1 has "/drive/" as its path part. A record in which a registered URL has "/drive/" as its path part is stored in the cache DB 80 (No. 32 in FIG. 10C). Therefore, the category corresponding to the input URL of No. 1 is identified based on the record of the cache DB 80, and the category ID "112" is output as the result of the category determination process. Since the category corresponding to the input URL of No. 1 is thus identified by the local lookup, the category determination process in the server side is not necessary.

The input URL of No. 2 has "/admin/" as its path part. A record in which a registered URL has "/admin/" as its path part is stored in the partial DB 26*c* (No. 22 in FIG. 10B). Therefore, the category corresponding to the input URL of No. 2 is identified based on the record of the partial DB 26*c*, and the category ID "101" is output as the result of the category determination process. Since the category corresponding to the input URL of No. 2 is thus identified by the local lookup, the category determination process in the server side is not necessary.

The input URL of No. 3 has "/drone/" as its path part. A record in which a registered URL has "/drone/" as its path part is not stored in the cache DB 80 nor in the partial DB 26*c*. In the partial DB 26*c*, a record in which a registered URL has, as its path part, the root "/" corresponding to the parent path of the path part "/drone/" is stored (No. 21 in FIG. 10B), but the flag "HAS_RIGHT" is appended to this record, and it is not possible to identify the category corresponding to the input URL only based on the record stored in the partial DB 26*c*. On the other hand, a record in which a registered URL has "/drone/" as its path part is stored in the full DB 24*c* (No. 16 in FIG. 10A). Therefore, the category corresponding to the input URL of No. 3 is identified based on the record of the full DB 24*c*, and the category ID "112" is output as the result of the category determination process. Since the category corresponding to the input URL of No. 3 is thus identified by the server lookup, the category determination process in the server side is necessary.

The input URL of No. 4 has "/drink/" as its path part. A record in which a registered URL has "/drink/" as its path part is not stored in the cache DB 80 nor in the partial DB 26*c*. In the partial DB 26*c*, a record in which a registered URL has, as its path part, the root "/" corresponding to the parent path of the path part "/drink/" is stored (No. 21 in FIG. 10B), but the flag "HAS_RIGHT" is appended to this record, and it is not possible to identify the category corresponding to the input URL only based on the record stored in the partial DB 26*c*. A record in which a registered URL has "/drink/" as its path part is not stored in the full DB 24*c* either, but since all the registered URLs are stored in the full DB 24*c*, it is possible to determine the category by referring to the record in which a registered URL has, as its path part, the root "/" corresponding to the parent path of the path part "/drink/" (No. 11 in FIG. 10A) and other associated records indicated by the flag "HAS_RIGHT" appended to this record. Consequently, the category corresponding to the registered URL is identified, and the same category ID "100" as that of this record is output as the result of the category determination process. Since the category corresponding to the input URL of No. 4 is thus identified by the server lookup, the category determination process in the server side is necessary.

Figure 12:
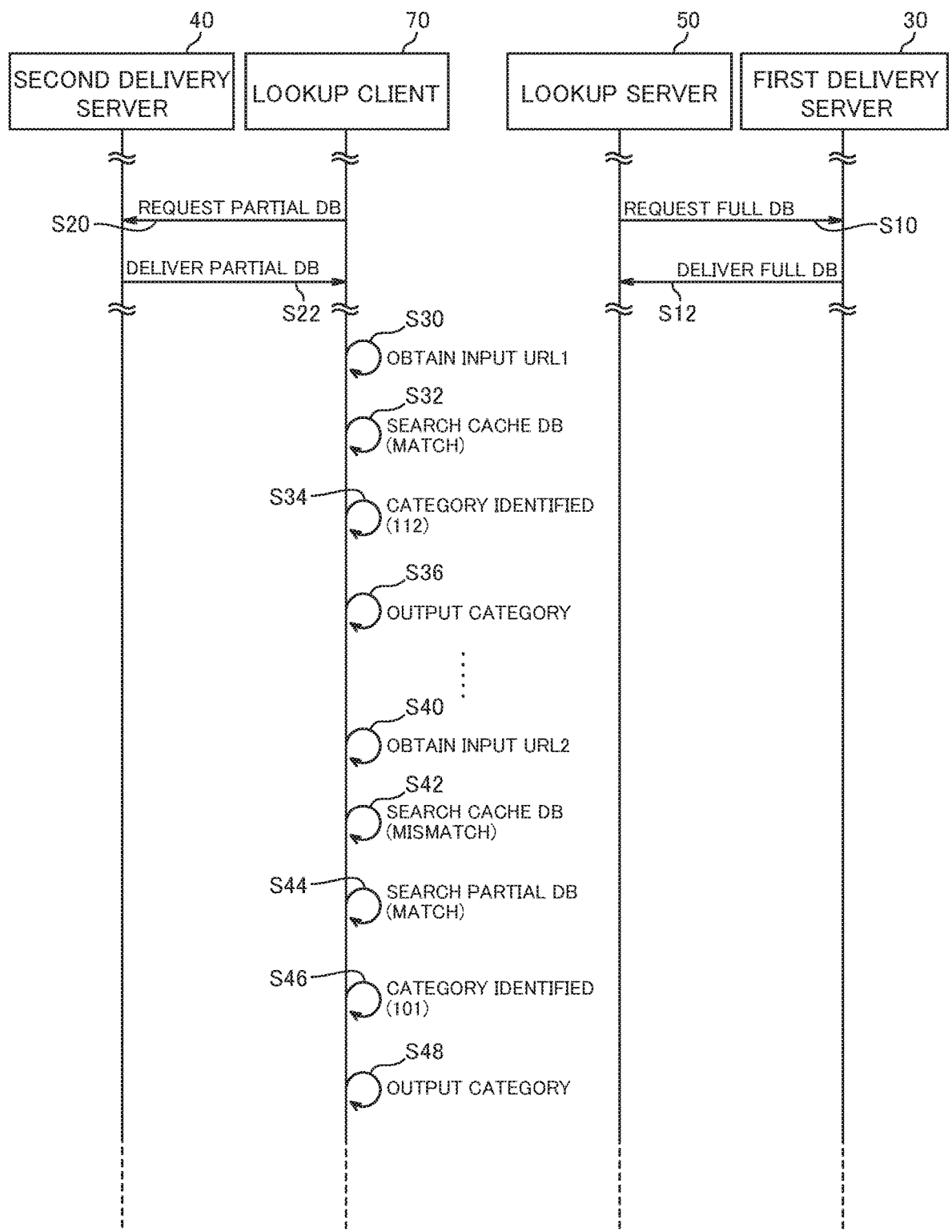
FIG. 12 is a sequence chart illustrating an operation example of the web filtering system when the input URLs of No. 1 and 2 are designated.

FIG. 12 is a sequence chart illustrating an operation example of the web filtering system 100 when the input URLs of No. 1, 2 in FIG. 11 are designated. Steps corresponding to protocol negotiation and session establishment executed prior to packet transmission/reception among the computers are general matter and therefore a description thereof will be omitted. Hereinafter, a description will be given according to the operation example.

Steps S10, S12: When the lookup server 50 requests the first delivery server 30 to deliver the full DB 24*c* (S10), the first delivery server 30 delivers the full DB 24*c* to the lookup server 50 (S12).

Steps S20, S22: When the lookup client 70 requests the second delivery server 40 to deliver the partial DB 26*c* (S20), the second delivery server 40 delivers the partial DB 26*c* to the lookup client 70 (S22).

In this manner, the lookup server 50 and the lookup client 70 periodically (for example, three times per day) download the full DB 24*c* from the first delivery server 30 and download the partial DB 26*c* from the second delivery server 40 respectively. The timing and period of the download differ between the lookup server 50 and the lookup client 70.

Step S30: When the user terminal 90 tries to access the input URL "http://www.test.com/drive/" of No. 1 in FIG. 11 through the web browser 92, the lookup client 70 obtains this input URL.

Steps S32 to S36: When the lookup client 70 searches the cache DB 80, a record whose registered URL matches the input URL is hit (S32), and the category "112" corresponding to the input URL is identified (S34). The lookup client 70 outputs this category (S36), and controls the access to the website by the user terminal 90 according to the user setting for this category.

Step S40: When the user terminal 90 tries to access the input URL "http://www.test.com/admin/" of No. 2 in FIG. 11 through the web browser 92 after a while, the lookup client 70 obtains this input URL.

Steps S42 to S48: The lookup client 70 first searches the cache DB 80, but no record whose registered URL matches the input URL is hit (S42). Then, when the lookup client 70 searches the partial DB 26*c*, a record whose registered URL matches the input URL is hit (S44), and the category "101" corresponding to the input URL is identified (S46). The lookup client 70 outputs this category (S48), and controls the access to the website by the user terminal 90 according to the user setting for this category.

As described above, when a record whose registered URL matches the input URL is included in the cache DB 80 or the partial DB 26*c* and the category is identified by the local lookup, no communication between the lookup client 70 and the lookup server 50 occurs.

Figure 13:
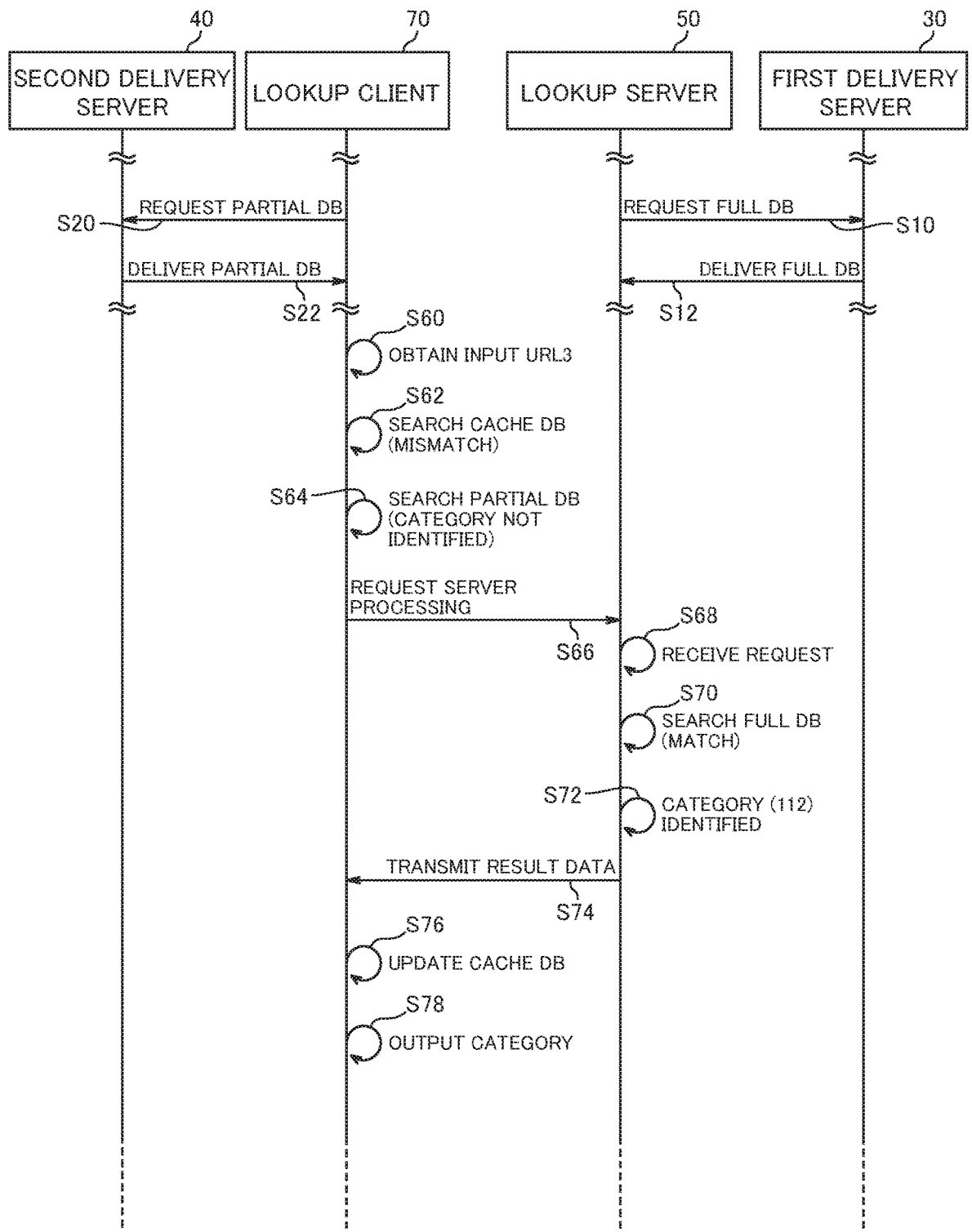
FIG. 13 is a sequence chart illustrating an operation example of the web filtering system when the input URL of No. 3 is designated.

FIG. 13 is a sequence chart illustrating an operation example of the web filtering system 100 when the input URL of No. 3 in FIG. 11 is designated. Incidentally, since the operations regarding the download of the databases performed in advance (Steps S10, S12, S20, S22) are the same as those illustrated in FIG. 12, a description thereof will be omitted. Hereinafter, a description will be given in accordance with the operation example.

Step S60: When the user terminal 90 tries to access the input URL "http://www.test.com/drone/" of No. 3 in FIG. 11 through the web browser 92, the lookup client 70 obtains this input URL.

Steps S62 to S66: The lookup client 70 first searches the cache DB 80, but no record whose registered URL matches the input URL is hit (S62). The lookup client 70 next searches the partial DB 26*c*, but is not capable of identifying a category corresponding to the input URL (S64). Then, the lookup client 70 requests the lookup server 50 to execute the server-side category determination (S66).

Steps S68 to S74: The lookup server 50 receives the request from the lookup client 70 (S68). Then, when it obtains the input URL sent with the request to search the full DB 24*c*, a record whose registered URL matches the input URL is hit (S70), and the category "112" corresponding to the input URL is identified (S72). The lookup server 50 transmits result data of the category determination to the lookup client 70 (S74).

Steps S76, S78: The lookup client 70 updates the cache DB based on the result data sent from the lookup server 50 (S76). Further, the lookup client 70 outputs the identified category (S78), and controls the access to the website by the user terminal 90 according to the user setting for this category.

As described above, when the category is not identified by the local lookup, the lookup client 70 requests the lookup server 50 to execute the server-side category determination, and the lookup server 50 sends the result of the category determination executed according to this request, to the lookup client 70 as a response. That is, the communication between the lookup client 70 and the lookup server 50 occurs only when the category is not identified by the local lookup.

FIGS. 14A and 14B illustrate explanatory charts of the category determination process executed in the server side using the flag "HAS_LEFT". The flag "HAS_LEFT" has already been described, and to a record to which the flag "HAS_LEFT" is appended, a flag "HAS_LEFT_NO-CLEAR" is also sometimes appended. The flag "HAS_LEFT_NOCLEAR" indicates that there is stored another record having a registered URL in which a domain part of a registered URL of a record to which this flag is appended is a parent domain across a plurality of domain hierarchies. When the category is identified based on the record to which the flag "HAS_LEFT_NOCLEAR" is appended, the flag "HAS_LEFT" is not deleted from the result data.

Hereinafter, specific examples of the category determination process using the flags "HAS_LEFT" and "HAS_LEFT_NOCLEAR" will be described according to examples of registered records of the databases. It should be noted that the examples listed up in the tables in FIGS. 14A and 14B have no relevancy to the examples which have appeared in the description so far.

The table of FIG. 14A shows examples of the records stored in the full DB 24c used in the server lookup. In the table, the left column indicates the number assigned for convenience of the description, the second column from the left indicates registered URL, and the second column from the right indicates category ID, and the right column indicates flag. In this table, four records No. 41 to 44 are listed as examples.

The flag "HAS_LEFT_NOCLEAR" together with the flag "HAS_LEFT" is appended to the record No. 41. Only the flag "HAS_LEFT" is appended to the record No. 42. No flag is appended to the records No. 43 and 44.

The domain part "aaa.xyz.com" of the registered URL of No. 42 has, as its parent domain, the domain part "xyz.com" of the registered URL of No. 41. Therefore, the flag "HAS_LEFT" is appended to the record No. 41. Further, the domain part "a1.aaa.xyz.com" of the registered URL of No. 43 has, as its parent domain, the domain part "aaa.xyz.com" of the registered URL of No. 42. Therefore, the flag "HAS_LEFT" is appended to the record No. 42. In all of these examples, the two compared domain parts are in a parentdomain-subdomain relation (one hierarchy), and are not in a relation across a plurality of domain hierarchies.

The parent domain of the domain part "b1.bbb.xyz.com" of the registered URL of No. 44 is "bbb.xyz.com". A record in which a registered URL has "bbb.xyz.com" as its domain part is not stored, but the record No. 41 has the parent domain "xyz.com" of this domain as its domain part of the registered URL. That is, the domain part "b1.bbb.xyz.com" of the registered URL of No. 44 has the domain part "xyz.com" of the registered URL of No. 41, as its parent domain across a plurality of domain hierarchies (two hierarchies). Therefore, the flag "HAS_LEFT_NOCLEAR" is appended to the record No. 41.

The table of FIG. 14B shows result data returned from the server when each input URL is designated and the category determination process is executed in the server side. In the table, the left column indicates the number assigned for convenience of the description, and the second column from the left indicates the input URL. The three columns from the right indicate the result data (match URL, category ID, and flag) obtained and returned in Step S340 in FIG. 9 as the result of the category determination process executed in the server side.

The input URL of No. 1 has "www.aaa.xyz.com" as its domain part, and its parent domain is the domain part "aaa.xyz.com" of the registered URL of No. 42. Typically, the subdomain "www.aaa.xyz.com" often has the same path structure as that of the parent domain "aaa.xyz.com", and the both domains can be regarded as the same. Accordingly, the category corresponding to the input URL of No. 1 is identified based on the record No. 42, and the category ID "200" is returned. At this time, the flag "HAS_LEFT" appended to the parent domain is not inherited to the result data. As described above, in the execution of the category determination, when a subdomain having a specific character string in the lowest hierarchy is designated as an input URL, the subdomain is regarded as the same as the parent domain, and in addition, the flag "HAS_LEFT" appended to the parent domain is not returned to the result data. Incidentally, specific character strings for which such category determination is made include "m", "mobile", "i", and so on besides the aforesaid "www".

The input URL of No. 2 has "a2.aaa.xyz.com" as its domain part, and its parent domain is the domain part "aaa.xyz.com" of the registered URL of No. 42. Therefore, the category corresponding to the input URL of No. 2 is identified based on the record No. 42, and the category ID "200" is returned. The flag "HAS_LEFT" appended to the record No. 42 indicates that its domain has a subdomain on the immediately lower hierarchy, and does not mean that the domain part of the input URL of No. 2 has an additional subdomain. Therefore, the flag "HAS_LEFT" appended to the parent domain is not returned to the result data. That is, the flag "HAS_LEFT" is deleted from the result data.

The input URL of No. 3 has "bbb.xyz.com" as its domain part, and its parent domain is the domain part of the registered URL of No. 41. Therefore, the category corresponding to the input URL of No. 3 is identified based on the record No. 41, and the category ID "100" is returned. The flag "HAS_LEFT" appended to the record No. 41 indicates that its domain has a subdomain on an immediately lower hierarchy, and does not mean that the domain part of the input URL of No. 3 has an additional subdomain. However, the flag "HAS_LEFT_NOCLEAR" is also appended to the record No. 41, and accordingly, in the category determination process, it should be taken into consideration that there exists a subdomain having this domain as its parent domain across a plurality of hierarchies. Therefore, the flag "HAS_LEFT" appended to this domain is returned to the result data. That is, the flag "HAS_LEFT" is not deleted from the result data.

FIGS. 15A and 15B illustrate explanatory charts of the category determination process executed in the server side using the flag "HAS_RIGHT". The flag "HAS_RIGHT" has already been described, and to a record to which the flag "HAS_RIGHT" is appended, a flag "HAS_RIGHT_NO-CLEAR" is also sometimes appended. The flag "HAS_RIGHT_NOCLEAR" indicates that a path part of a registered URL of a record that is a cause for appending the flag "HAS_RIGHT" is also inherited to another unspecified subdomain. When the category is identified based on the record to which the flag "HAS_RIGHT_NOCLEAR" is appended, the flag "HAS_RIGHT" is not deleted from the result data.

Hereinafter, specific examples of the category determination process using the flags "HAS_RIGHT" and HAS_RIGHT_NOCLEAR" will be described according to examples of the registered records of the database. It should be noted that the examples listed up in the tables in FIGS. 15A and 15B have no relevancy to the examples which have appeared in the description so far.

The table of FIG. 15A shows examples of the records stored in the full DB 24c used for the server lookup. In the table, the left column indicates the number assigned for convenience of the description, the second column from the left indicates registered URL, the second column from the right indicates category ID, and the right column indicates flag. In this table, five records No. 51 to 53 and No. 61, 62 are listed as examples.

The flags "HAS_LEFT" and "HAS_RIGHT" are appended to the record No. 51. Only the flag "HAS_RIGHT" is appended to the record No. 52. No flag is appended to the record No. 53.

Parent domains of domain parts of the registered URLs of No. 52, 53 are both the domain part "xyz.com" of the registered URL of No. 51. Therefore, the flag "HAS_LEFT" is appended to the record No. 51. Further, the registered URL of No. 53 forwardly matches the registered URL of No. 52 and also has the path part "/museum/" which is longer than the path part "/" of the registered URL of No. 52. Therefore, the flag "HAS_RIGHT" is appended to the record No. 52.

Further, the flag "HAS_RIGHT_NOCLEAR" is appended together with the flags "HAS_LEFT" and "HAS_RIGHT" to the record No. 61. No flag is appended to the record No. 62.

The flag "HAS_RIGHT_NOCLEAR" appended to the record No. 61 indicates that a plurality of subdomains constituted by a place name or a orderly name such as an automatically generated standard character string (for example, "tokyo.abc.com" and "osaka.abc.com") exist in this domain "abc.com", and these subdomains have the same path structure. In the category determination for all the subdomains whose parent domains are a domain part of a record to which the flag "HAS_RIGHT_NOCLEAR" is appended, it is regarded based on this flag that these subdomains have the same path structure as that of the parent domain.

The table of FIG. 15B shows result data returned from the server when each input URL is designated and the category determination process is executed in the server side. In the table, the left column indicates the number assigned for convenience of the description, and the second column from the left indicates input URL. The three columns from the right indicate the result data (match URL, category ID, and flag) obtained and returned in Step S340 in FIG. 9 as the result of the category determination process executed in the server side.

The input URL "http://cat.xyz.com/" of No. 1 exactly matches the registered URL of No. 52. Therefore, the category corresponding to the input URL of No. 1 is identified based on the record No. 52, and the same category ID "600" and flag "HAS_RIGHT" as those of this record are returned as the result data.

The input URL "http://cat.xyz.com/music/" of No. 2 has the same domain part as that of the registered URL of No. 52, and has the path part "/music/" which is longer than the path part "/" of the registered URL of No. 52. The input URL of No. 2 also has the same domain part as that of the registered URL of No. 53, and its path part partially matches but the part after "/musi" does not match the path part of the registered URL of No. 53. Therefore, the category corresponding to the input URL of No. 2 is identified based on the record No. 52, and the match URL "http://cat.xyz.com/musi" together with the category ID "600" is returned. The flag "HAS_RIGHT" appended to the record No. 52 is a flag appended to the parent path "/", and does not mean that there is a registered URL having a longer path part than the path part "/musi" of the match URL returned for the input URL of No. 2. Therefore, the flag "HAS_RIGHT" appended to the parent path is not returned to the result data. That is, the flag "HAS_RIGHT" is deleted from the result data.

The domain part of the input URL of No. 3 is "dog.xyz.com", and its parent domain is the domain part "xyz.com" of the registered URL of No. 51. Therefore, the category corresponding to the input URL of the No. 3 is identified based on the record No. 51, and the category ID "500" is returned. The flag "HAS_LEFT" appended to the record No. 51 indicates that its parent domain has a subdomain on an immediately lower hierarchy, and does not mean that the domain part of the input URL of No. 3 has an additional subdomain. Therefore, the flag "HAS_LEFT" appended to the parent domain is not returned to the result data. Further, the flag "HAS_RIGHT" appended to the record No. 51 is a flag appended to the root path "/" of the parent domain "xyz.com", and does not mean that there exists a registered URL having a longer path part than the path part of the input URL of No. 3. Therefore, the flag "HAS_RIGHT" appended to the parent domain is not returned to the result data. That is, the flags "HAS_LEFT" and "HAS_RIGHT" are both deleted from the result data.

The input URL of No. 4 has "tokyo.abc.com" as its domain part and its parent domain is the domain part "abc.com" of the registered URL of No. 61. Therefore, the category corresponding to the input URL of No. 4 is identified based on the record No. 61, and the category ID "800" is returned. The flag "HAS_LEFT" appended to the record No. 61 indicates that its parent domain has a subdomain on an immediately lower hierarchy, and does not mean that the domain part of the input URL of No. 4 has an additional subdomain. Therefore, the flag "HAS_LEFT" appended to the parent domain is not returned to the result data. Further, the flag "HAS_RIGHT" appended to the record No. 61 is a flag appended to the root path "/" of the parent domain "abc.com", and does not mean that there exists a registered URL having a longer path part than the path part of the input URL of No. 4. However, the flag "HAS_RIGHT_NOCLEAR" is also appended to the record No. 61, and accordingly, in the category determination process, it should be taken into consideration that there exists a registered URL having a longer path part than that of the parent path. Therefore, the flag "HAS_RIGHT" appended to the parent domain is returned to the result data. That is, the flag "HAS_LEFT" is deleted from the result data, but the flag "HAS_RIGHT" is not deleted from the result data.

The input URL "http://osaka.abc.com/drug/" of No. 5 has, as its parent domain, the domain part "abc.com" of the registered URL of No. 62, and its path part matches the path part "/drug/" of the registered URL of No. 62. Therefore, the category corresponding to the input URL of No. 5 is identified based on the record No. 62, and the category ID "900" is returned. Since no flag is appended to the record No. 62, no flag is returned to the result data.

As described above, the flags appended to the record serving as a basis of the category determination are deleted from the result data (is not returned as the result data) according to the situation, but when the flag "HAS_*_NOCLEAR" is appended, the flag "HAS_*" is left in the result data (returned as the result data).

In the web filtering system 100, when a category corresponding to a designated input URL is not identified in the local lookup executed using the cache DB 80 and the partial DB 26c, the category is identified in the server lookup executed using the full DB 24c. The result data returned from the server side in accordance with this process is temporarily stored in the cache DB 80 in the client side and is used in the local lookup executed thereafter. Therefore, by returning an appropriate flag together with the match URL and the category ID as the result data to the client side, it is possible to enhance a hit rate of data in the local lookup.

Second Embodiment

Figure 16:
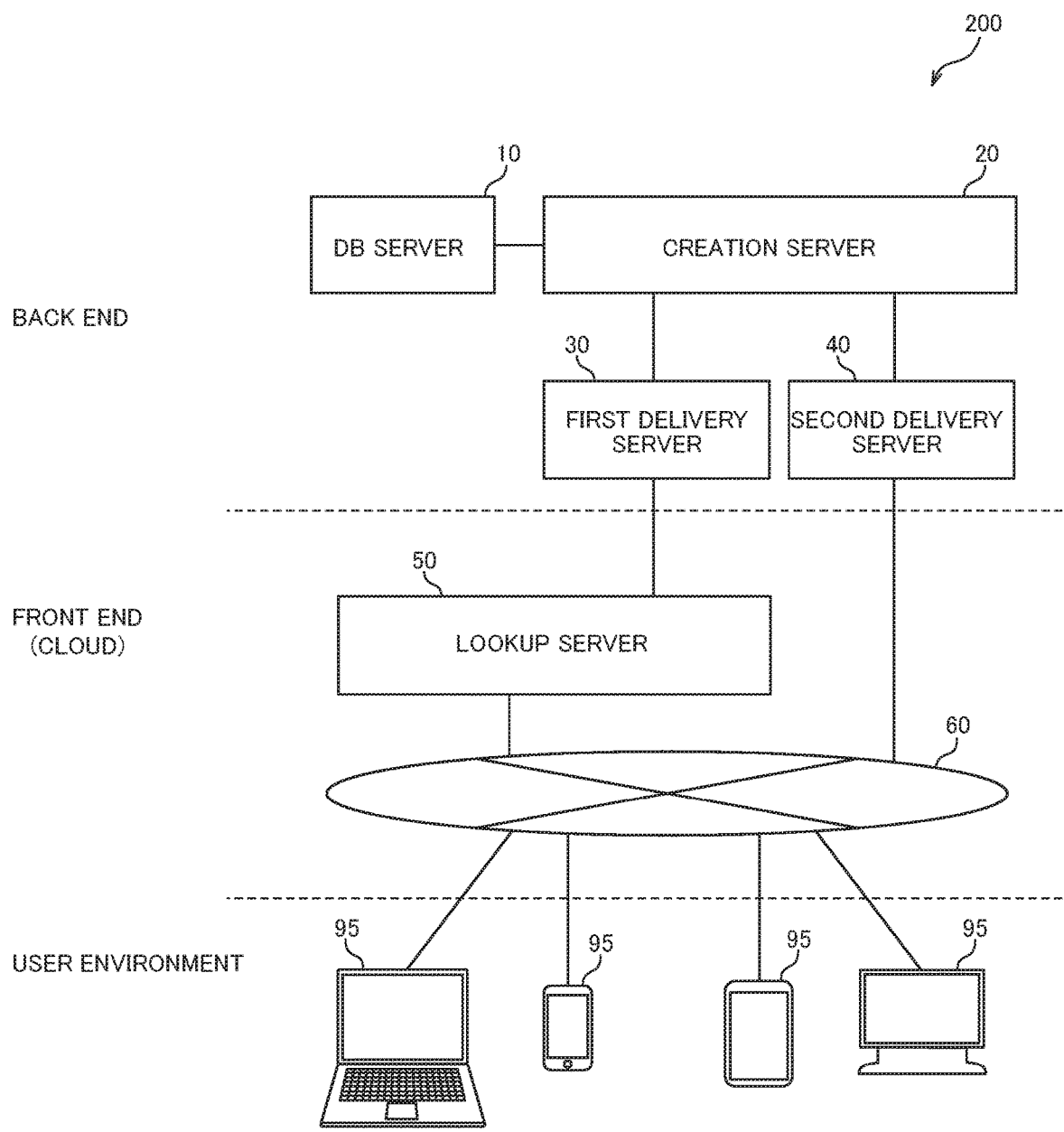
FIG. 16 is a block diagram of an environment where a web filtering system of a second embodiment operates.

Next, a web filtering system of a different embodiment will be described. FIG. 16 is a block diagram of an environment where a web filtering system 200 of a second embodiment operates.

The web filtering system 200 of the second embodiment is different from the web filtering system 100 of the above-described first embodiment in that user terminals 95 have both the functions of the lookup client 70 and the user terminals 90 in the web filtering system 100 of the first embodiment. In other words, in the web filtering system 200 of the second embodiment, the function of the local lookup is mounted in the user terminals 95, and the user terminals 95 each execute both an access request to a website through a web browser or the like and the local lookup for a URL (input URL) the access request to which is made. The user terminals 95 each correspond to a mobile device such as a computer, a smartphone, or a tablet PC, for instance.

Figure 17:
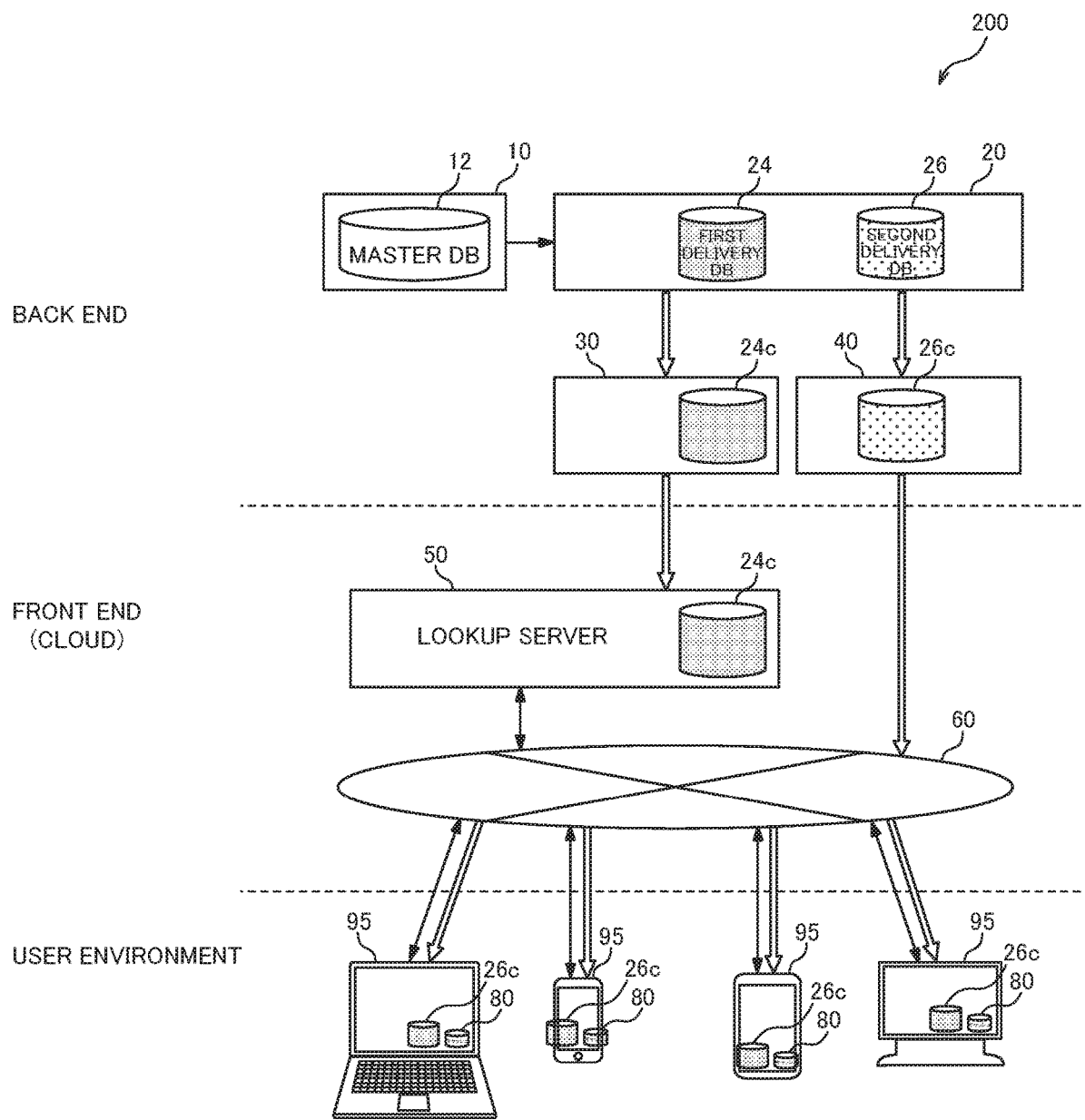
FIG. 17 is a schematic diagram illustrating the flows of data in the web filtering system of the second embodiment.

FIG. 17 is a schematic diagram illustrating the flows of data in the web filtering system 200 of the second embodiment. Note that the outline arrows in the drawing indicate the flows of the databases, and the black arrows indicate the flows of data other than the databases.

The user terminals 95 are connectable to the Internet 60. As described above, in the web filtering system 200 of the second embodiment, the function of the local lookup is mounted in the user terminals 95. Therefore, the partial DB 26c used in the local lookup is delivered to the user terminals 95 from the second delivery server 40 through the Internet 60.

When an access request to a website occurs in the user terminal 95, the user terminal 95 first executes the local lookup by using the partial DB 26c and the cache DB 80 and tries to identify a category corresponding to an input URL. When the category is identified by the local lookup, the user terminal 95 controls whether to permit the access to the website, based on the identified category. On the other hand, when the category is not identified by the local lookup, the user terminal 95 requests the lookup server 50 to execute the server lookup, and controls whether to permit the access to the website, based on a response result from the lookup server 50 to this request.

Incidentally, in the web filtering system 200 of the second embodiment, a smaller upper limit (for example, 1 to 10 MB) is set for the data size of the cache DB 80 than in the web filtering system 100 of the first embodiment, in consideration of that the cache DB 80 is stored in a resource of the user terminal 95 not having a very large storage capacity. Further, in FIG. 17, the partial DB s 26c delivered to the user terminals 95 are depicted with a smaller size than that of the partial DB 26c to be delivered by the second delivery server 40, but this is because of a spatial reason of the drawing, and the partial DBs 26c illustrated in FIG. 17 are all duplicates of the partial DB 26 created by the creation server 20, and these databases have the same size.

Superiority of Embodiments

As described above, in the above-described web filtering system 100 (web filtering system 200), out of the data looked up in the course of the category determination process, the full DB 24c storing the entire data is delivered to the lookup server 50, while the partial DB 26c storing the partial data extracted from the entire data according to the predetermined criterion is delivered to the lookup client 70 (user terminals 95). Further, result data of the server lookup executed when a category corresponding to an input URL is not identified by the local lookup is temporarily stored in the cache DB 80. The full DB 24c, the partial DB 26c, and the cache DB 80 each have the data structure enabling the category determination using the flags.

When an access request to a website by the user terminal 90 (user terminal 95) occurs, the lookup client 70 (user terminal 95) first uses the cache 80 and then uses the partial DB 26c to try to identify a category corresponding to an input URL by the local lookup. Then, only when the category is not identified by the local lookup, the lookup server 50 is requested to execute the category determination in the server side and identify the category.

Therefore, according to the web filtering system 100 (web filtering system 200), the efficient matching of the registered URL partially matching the input URL is enabled in the course of the lookup. Further, such a data structure can eliminate the redundant storage of records having registered URLs whose domain parts and path parts have deep hierarchies. Consequently, it is possible to improve data efficiency of the full DB 24c and the partial DB 26c, leading to an enhanced hit rate of data in the local lookup.

Further, the increase in the hit rate in the local lookup makes it possible to reduce a used memory amount involved in the local lookup and lowers the frequency with which the category determination in the server side is required. Therefore, according to the web filtering system 100 (web filtering system 200), compared with a case where an inquiry is given to the lookup server 50 every time, it is possible to reduce the number of times the lookup client 70 (user terminal 95) makes an inquiry to the lookup server 50 to minimize the communication amount between the lookup client 70 (user terminal 95) and the lookup server 50. As a result, it is possible to shorten the response time required for the control of access requests to websites.

Further, since the partial DB 26c is created by the extraction of the necessary and sufficient partial data from the entire data stored in the full DB 24c and the upper limit of the data amount is set for the cache DB 80, a local resource of the lookup client 70 (user terminals 95) is not excessively consumed. This also contributes to the reduction in the used memory amount involved the local lookup. The reduction in the used memory amount enables to obtain an excellent processing speed in the local lookup.

Further, by creating the partial DB 26c by, for example, preferentially extracting data to which no flag is appended in a descending order of the access frequency, from the entire data stored in the full DB 24c, it is possible to further increase the hit rate of data in the local lookup. The improvement in the data hit rate in the local lookup lowers the frequency with which the server lookup is required, and as a result, can further contribute to the reduction in the communication amount between the lookup client 70 (user terminal 95) and the lookup server 50.

As described above, according to the web filtering system 100 (web filtering system 200), the lookup client 70 (user terminal 95) is capable of efficiently executing the control of the access permission/non-permission of an access request to a website by the user terminal 90 (user terminal 95). Distinguished superiority of the embodiments is obvious in all of the aspects of the communication amount, the used memory amount, and the processing speed.

The present invention is not limited to the above-described embodiments, and can be variously changed when it is carried out. Further, various kinds of the numerical values given in the embodiments are only examples and are not limited to the above-described contents.

In the above-described embodiments, the two kinds of delivery databases (the full DB 24c, the partial DB 26c) are delivered by the different delivery servers respectively, but they may be delivered by the same delivery server.

In the above-described embodiments, the master DB 12 is managed/provided in the DB server 10, but the master DB 12 may be implemented in an internal storage area of the creation server 20, or may be implemented in an external storage medium such as an external hard disk drive (HDD) connected to the creation server 20 through any of various kinds of ports such as USB and SCSI.

In the above-described embodiments, the flags appended to a record serving as a basis of the category determination are deleted from the result data according to the situation, and only when the flag "HAS_*_NONCLEAR" is appended, the flag "HAS_*" is left in the result data, but this is not restrictive. Another possible structure is that, for example, the flag appended to the record serving as a basis of the category determination is not deleted. Still another possible structure is that whether to delete the flag appended to the record serving as a basis of the category determination (whether to return it as the result data) can be changed by the setting.

In the above-described first embodiment, as a user of the web filtering system 100, a business organization and school are taken as examples, but the user is not limited to these, and for example, a communication carrier can also use the web filtering system 100. In this case, connection devices used by clients of the communication carrier correspond to the user terminals 90, and a server being a connection destination of these connection devices corresponds to the lookup client 70.

What is claimed is:

1. A web filtering system comprising:
   a first storage configured to store uniform resource locators (URLs) of websites, categories corresponding to the URLs, and flags appended to respective ones of the URLs;
   a lookup server comprising a first central processing unit (CPU) configured to, when accepting a request for determining a category corresponding to a designated URL as a request for server determination, send a result of the determination which is executed using the first storage, as a response to a requester of the server determination;
   a second storage configured to store periodically delivered records which are partial records extracted from all records stored in the first storage, the partial records being extracted according to a criterion predetermined on a delivery-data creation side, and the criterion including a number of accesses to the URLs and whether a flag is appended to the URLs;
   a cache storage configured to temporarily store result data which is transmitted from the lookup server as the response to the request for the server determination; and
   a lookup client which is in communication with the lookup server,
   the lookup client comprising a second CPU configured to:
      when accepting a request for determining a category corresponding to a designated URL as a request for local determination, (i) attempt the determination by first using the cache storage, and when the category is determined using the cache storage, send the determined category as a response to a requester of the local determination, (ii) when the category cannot be determined using the cache storage, attempt the determination by using the second storage, and when the category is determined using the second storage, send the determined category as a response to the requester of the local determination, and (iii) when the category still cannot be determined using the second storage, request the lookup server to execute the server determination while designating the URL, and send the category determined by the lookup server as a response to the requester of the local determination; and
      when an access request to a website is made by a user terminal, execute the local determination while designating a URL of the website and control whether to permit the access request or not according to the determined category corresponding to the designated URL.

2. The web filtering system according to claim 1, wherein each of the flags stores a value regarding the presence of another record having a URL associated with the URL of the website.

3. The web filtering system according to claim 2, wherein the first CPU of the lookup server transmits result data including a match URL, which is a URL that at least forwardly matches the designated URL, and a category corresponding to the match URL, as the response to the request by the lookup client for the server determination, and when a flag is appended to a URL used as a basis for determining the category corresponding to the designated URL and a predetermined condition is satisfied, makes the flag included as a flag to the match URL in the result data.

4. The web filtering system according to claim 2, further comprising:
   a first delivery server configured to deliver data to be stored in the first storage; and
   a second delivery server configured to deliver data to be stored in the second storage.

5. The web filtering system according to claim 2, further comprising:
   a creation server configured to create the data to be stored in the first storage and the data to be stored in the second storage.

6. The web filtering system according to claim 1, further comprising:
   a first delivery server configured to deliver data to be stored in the first storage; and
   a second delivery server configured to deliver data to be stored in the second storage.

7. The web filtering system according to claim 1, further comprising:

a creation server configured to create the data to be stored in the first storage and the data to be stored in the second storage.

* * * * *